(12) United States Patent  
Slavin et al.

(10) Patent No.: US 11,741,805 B2
(45) Date of Patent: Aug. 29, 2023

(54) VIDEO MONITORING AND ALARM VERIFICATION TECHNOLOGY

(71) Applicant: Alarm.com Incorporated, Tysons, VA (US)

(72) Inventors: Alison Jane Slavin, Falls Church, VA (US); Robert J. McCarthy, Jr., Vienna, VA (US); David James Hutz, Herndon, VA (US); Stephen Scott Trundle, Falls Church, VA (US); Jean-Paul Martin, Oakton, VA (US)

(73) Assignee: Alarm.com Incorporated, Tysons, VA (US)

( * ) Notice: Subject to any disclaimer, the term of this patent is extended or adjusted under 35 U.S.C. 154(b) by 220 days.

(21) Appl. No.: 17/130,412

(22) Filed: Dec. 22, 2020

(65) Prior Publication Data

US 2021/0110686 A1 Apr. 15, 2021

Related U.S. Application Data

(63) Continuation of application No. 16/502,620, filed on Jul. 3, 2019, now Pat. No. 10,902,707, which is a (Continued)

(51) Int. Cl.
*G08B 13/196* (2006.01)
*H04N 7/18* (2006.01)
*H04M 11/04* (2006.01)

(52) U.S. Cl.
CPC . *G08B 13/19684* (2013.01); *G08B 13/19654* (2013.01); *H04M 11/04* (2013.01); *H04N 7/183* (2013.01)

(58) Field of Classification Search
CPC ....... G08B 13/19684; G08B 13/19654; H04M 11/04; H04N 7/183
See application file for complete search history.

(56) References Cited

U.S. PATENT DOCUMENTS 6,965,313 B1 * 11/2005 Saylor ................. G08B 25/016
340/539.18
6,970,183 B1 11/2005 Monroe
(Continued)

OTHER PUBLICATIONS

U.S. Non-Final Office Action for U.S. Appl. No. 13/011,087 dated May 21, 2013, 20 pages.
(Continued)

*Primary Examiner* — Sath V Perungavoor
*Assistant Examiner* — Tyler B Edwards
(74) *Attorney, Agent, or Firm* — Fish & Richardson P.C.

(57) ABSTRACT

Video monitoring and alarm verification technology, in which a first connection is established between a first device and a camera located in a monitored property associated with a user of the first device and image data captured by the camera is received over the first connection and at the first device. A determination is made to establish a second connection with a second device that enables sharing of the received image data with the second device and, in response to the determination, the second connection is established between the first device and the second device. The received image data is shared with the second device over the second connection and the second device is restricted from directly accessing image data captured by the camera located in the monitored property.

20 Claims, 12 Drawing Sheets

Related U.S. Application Data continuation of application No. 15/332,613, filed on Oct. 24, 2016, now Pat. No. 10,388,134, which is a continuation of application No. 14/598,522, filed on Jan. 16, 2015, now Pat. No. 9,478,112, which is a continuation of application No. 14/461,749, filed on Aug. 18, 2014, now Pat. No. 8,937,661, which is a continuation of application No. 13/970,266, filed on Aug. 19, 2013, now Pat. No. 8,810,657, which is a continuation of application No. 13/011,087, filed on Jan. 21, 2011, now Pat. No. 8,520,072, which is a continuation-in-part of application No. 12/897,359, filed on Oct. 4, 2010, now Pat. No. 8,675,071.

(60) Provisional application No. 61/248,247, filed on Oct. 2, 2009.

(56) References Cited

U.S. PATENT DOCUMENTS

| | | | | |
|---|---|---|---|---|
| 8,520,072 | B1 * | 8/2013 | Slavin | H04M 11/04 348/143 |
| 8,810,657 | B1 * | 8/2014 | Slavin | H04M 11/04 348/143 |
| 8,937,661 | B1 | 1/2015 | Slavin et al. | |
| 10,388,134 | B1 | 8/2019 | Slavin et al. | |
| 2002/0104094 | A1 | 8/2002 | Alexander et al. | |
| 2003/0012344 | A1 * | 1/2003 | Agarwal | H04M 11/045 379/37 |
| 2007/0009104 | A1 | 1/2007 | Renkis | |

OTHER PUBLICATIONS

U.S. Notice of Allowance for U.S. Appl. No. 13/011,087 dated Jul. 19, 2013, 10 pages.
U.S. Non-Final Office Action for U.S. Appl. No. 12/897,359 dated Aug. 19, 2013, 26 pages.
U.S. Final Office Action for U.S. Appl. No. 12/897,359 dated Dec. 2, 2013, 13 pages.
U.S. Non-Final Office Action for U.S. Appl. No. 13/970,266 dated Dec. 13, 2013, 17 pages.
U.S. Notice of Allowance for U.S. Appl. No. 12/897,359 dated Jan. 17, 2014, 7 pages.
U.S. Notice of Allowance for U.S. Appl. No. 13/970,266 dated Apr. 9, 2014, 8 pages.
U.S. Non-Final Office Action for U.S. Appl. No. 14/461,749 dated Oct. 23, 2014, 13 pages.
U.S. Notice of Allowance for U.S. Appl. No. 14/461,749 dated Dec. 4, 2014, 9 pages.

* cited by examiner

VIDEO MONITORING AND ALARM VERIFICATION TECHNOLOGY

CROSS REFERENCE TO RELATED APPLICATIONS

The present application is a continuation of U.S. patent application Ser. No. 16/502,620, filed Jul. 3, 2019, now allowed, which is a continuation of U.S. patent application Ser. No. 15/332,613, filed Oct. 24, 2016, now U.S. Pat. No. 10,388,134, issued Aug. 20, 2019, which is a continuation of U.S. application Ser. No. 14/598,522, filed Jan. 16, 2015, now U.S. Pat. No. 9,478,112, issued Oct. 25, 2016, which is a continuation of U.S. application Ser. No. 14/461,749, filed Aug. 18, 2014, now U.S. Pat. No. 8,937,661, issued Jan. 20, 2015, which is a continuation of U.S. application Ser. No. 13/970,266, filed Aug. 19, 2013, now U.S. Pat. No. 8,810,657, issued Aug. 19, 2014, which is a continuation of U.S. application Ser. No. 13/011,087, filed Jan. 21, 2011, now U.S. Pat. No. 8,520,072, issued Aug. 27, 2013, which is a continuation-in-part of U.S. application Ser. No. 12/897,359, filed Oct. 4, 2010, now U.S. Pat. No. 8,675,071, issued Mar. 18, 2014, which claims the benefit of U.S. Provisional Application No. 61/248,247, filed Oct. 2, 2009. All of these prior applications are incorporated herein by reference in their entirety for all purposes.

TECHNICAL FIELD

This disclosure relates to video monitoring and alarm verification technology.

BACKGROUND

Many people equip homes and businesses with alarm systems to provide increased security for their homes and businesses. Alarm systems may include control panels that a person may use to control operation of the alarm system and sensors that monitor for security breaches. In response to an alarm system detecting a security breach, the alarm system may generate an audible alert and, if the alarm system is monitored by a monitoring service, the alarm system may send electronic data to the monitoring service to alert the monitoring service of the security breach.

SUMMARY

Techniques are described for video monitoring and alarm verification technology.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for providing video monitoring and alarm verification. For some customers, privacy is a significant issue for home use of video or still-image security cameras. For that reason, those customers often do not want anyone else (including central station operators and police) to have access to images or video captured by home security system cameras without the explicit permission of the system owner. In some implementations, the techniques described throughout this disclosure allow the system owner to share video and other event data with third parties (e.g., pre-specified third parties) in the event of an emergency without granting access during non-emergencies, which may be defined by the system owner.

In some examples, a user that has a system monitoring a property can subscribe to alerts (e.g., text alerts or other types of notifications) about alarms or other activity of interest when the user is away from the user's property. Upon receipt of these alerts on a mobile device (e.g., a smart phone), the user can use a mobile application on the mobile device to watch live video (or view recently captured still images) from a security camera included in the user's monitoring system. The user can determine whether an alarm event is actually occurring in the user's property by reviewing the live video (or images). When the user determines that an alarm event is actually occurring in the user's property, the user can provide an input command (e.g., click a button from inside the mobile application) to alert an emergency contact list (including sending them a relevant video file or image file) and make a phone call to local police/emergency dispatch. When the user determines that an alarm event is not actually occurring in the user's property, the user can provide an input command (e.g., click a button from inside the mobile application) to control the monitoring system accordingly (e.g., deactivate an alarm being sounded by the monitoring system).

In some implementations, the type of notification sent may be an electronic mail message or text message with a description of the event, a video/image attachment, and/or a link that the recipient can use to log into an event portal that provides access to sensor status, live video, and/or saved video files relevant to the event. The link also may open a portal that displays a shared image of the customer web/mobile portal screen, allowing the customer to control what data/video/image is shared with the recipient. In these implementations, the owner of the alarm system maintains control over the information from the monitoring system that is shared.

Figure 1:
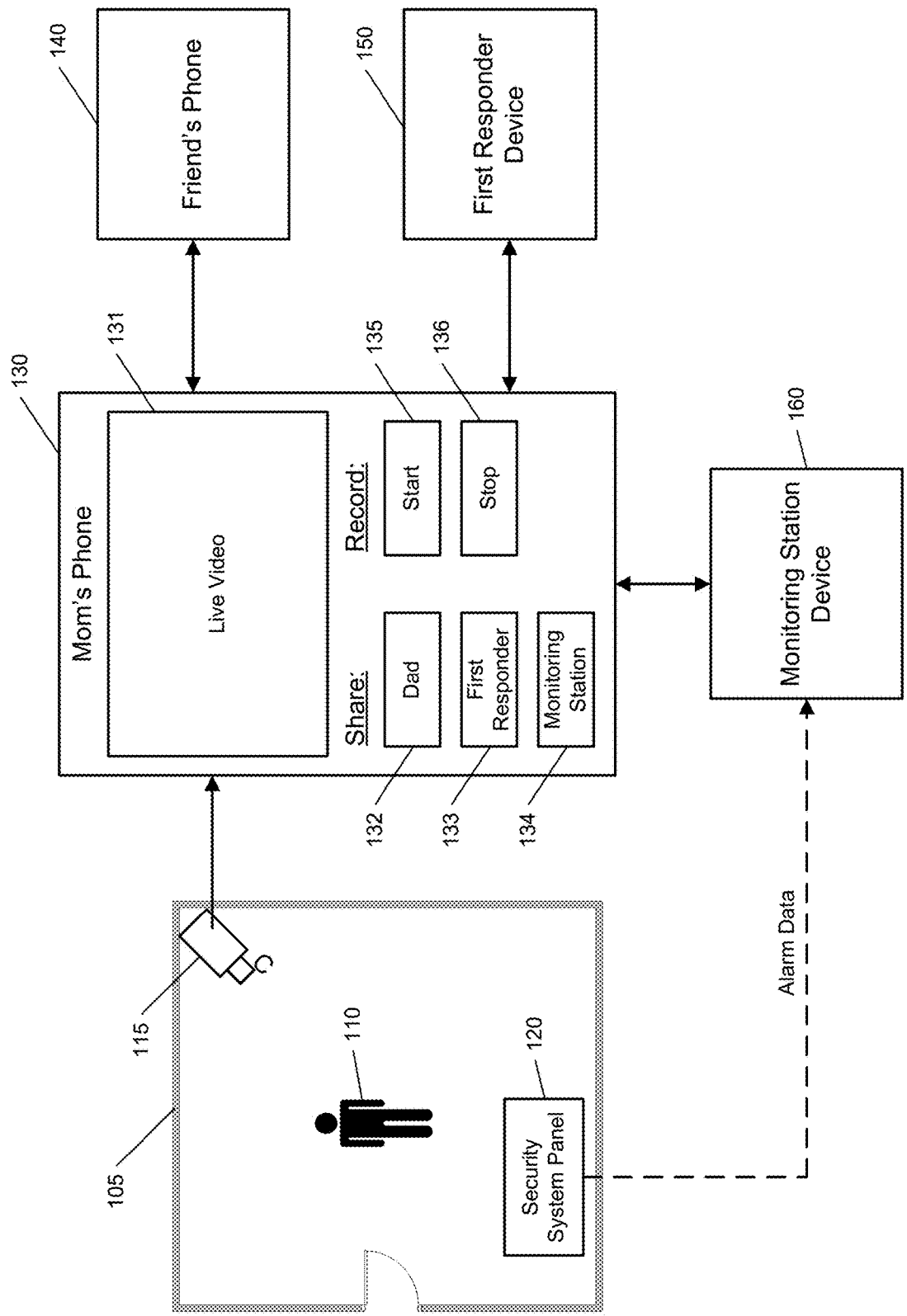
FIG. 1 illustrates an example of sharing image data.

FIG. 1 illustrates an example of sharing image data. As shown, a property 105 includes a camera 115 that captures images of the property 105 and a security system panel 120 of a security system that monitors the property 105 based on outputs of various sensors that sense physical events or conditions at the property 105. When a user 110 enters the property 105 at a time when the security system is armed, the security system panel 120 detects opening of a door to the property 105 based on output from a door sensor and initiates an entry delay period in which the user 110 may enter a password at the security system panel 120 to disarm the security system. In the example shown in FIG. 1, the user 110 does not enter a proper password at the security system panel 120 before expiration of the entry delay period and the security system panel 120 detects an alarm condition. Based on detection of the alarm condition, the security system panel 120 sends alarm data to a monitoring station device 160 of a monitoring station associated with security system of the property 105 (e.g., a central monitoring station that dispatches emergency services based on alarm events detected by security systems including the security system at the property 105).

In addition, the camera 115 establishes a connection with a mobile phone 130 used by a mom user and transmits live video of the property 105 to the mobile phone 130 over the established connection. The mobile phone 130 used by the mom user is registered as the primary contact of the camera 115 (or the security system) and is, therefore, provided with the live video. Other devices or multiple devices may be registered as contacts and may receive live video directly from the camera 115, as well.

The camera 115 may begin capturing video and initiate establishment of the connection with the mobile phone 130 based on the security system panel 120 detecting the alarm condition. For instance, the security system panel 120 may send a signal to the camera 115 in response to detecting the alarm condition and the camera 115 may begin capturing video and initiate establishment of the connection with the mobile phone 130 in response to receiving the signal. In other examples, the camera 115 may begin capturing video and initiate establishment of the connection with the mobile phone 130 based on the security system panel 120 detecting the door opening event when the user 110 entered the property 105. The camera 115 also may begin capturing video and initiate establishment of the connection with the mobile phone 130 based on the user 110 triggering a motion sensor (e.g., a Passive Infrared Motion detector) included in the camera 115. The camera 115 further may begin capturing and locally storing video based on the security system panel 120 detecting the door opening event or trigger of its own internal motion sensor and then initiate establishment of the connection with the mobile phone 130 based on the security system panel 120 detecting the alarm condition.

The mobile phone 130 includes a video display area 131 that displays the live video captured by the camera 115 on the mobile phone 130. In this regard, the mom user may use the mobile phone 130 to view live video of the property 105 and assess the alarm condition detected by the security system panel 120. The mobile phone 130 also displays a list of virtual buttons 132, 133, and 134 that the mom user can activate to initiate sharing of the live video to one or more other devices. The mobile phone 130 further displays a start button 135 and a stop button 136 that the mom user can activate to control recording of the live video on electronic storage of the mobile phone 130. In some examples, the mobile phone 130 may store a buffer of a set amount (e.g., one minute) of the live video data at all times. In these examples, when the start button 135 is activated, the set amount of live video data stored in the buffer is added to the front of the recording so that the recording covers up to the set amount (e.g., one minute) of live video data displayed prior to activation of the start button 135.

The list of virtual buttons 132, 133, and 134 includes a first button 132 that initiates sharing of the live video received from the camera 115 with a mobile phone 140 of a friend user, a second button 133 that initiates sharing of the live video received from the camera 115 with a first responder device 150 used by emergency services personnel that respond to alarm conditions, and a third button 134 that initiates sharing of the live video received from the camera 115 with the monitoring station device 160. The mom user may use the virtual buttons 132, 133, and 134 to establish a connection and share the live video with any one or more of the mobile phone 140 of the friend user, the first responder device 150, and the monitoring station device 160.

For example, when the mom user is uncertain of what the live video shows and would like assistance in verifying whether the alarm condition is an actual alarm or a false alarm, the mom user may activate the first button 132. In response to activation of the first button 132, the mobile phone 130 identifies contact information for the mobile phone 140 of the friend user (e.g., accesses contact information from an address book stored at the mobile phone 130) and establishes a connection with the mobile phone 140 of the friend user using the contact information. The mobile phone 130 then shares the live video received from the camera 115 with the mobile phone 140 of the friend user over the established connection. Accordingly, the mobile phone 140 of the friend user displays the live video concurrently with the mobile phone 130 of the mom user, so that the friend user can assist the mom user in assessing the live video and determining whether an actual alarm exists. The established connection between the mobile phone 130 and the mobile phone 140 may be a direct connection between the mobile phone 130 and the mobile phone 140 that allows the mobile phone 140 to receive shared video data from the mobile phone 130, but restricts the mobile phone 140 from accessing other data of the mobile phone 130 or learning of identification information for the camera 115. As such, the established connection between the mobile phone 130 and the mobile phone 140 allows the mom user to safely share the live video of the potential alarm condition with the friend user while preventing the friend user from accessing video captured by the camera 115 at other times.

When the mom user believes that the video would be helpful to a first responder that is responding to the alarm condition at the property 105, the mom user may activate the second button 133. In response to activation of the second button 133, the mobile phone 130 identifies contact information for the first responder device 150 and establishes a connection with the first responder device 150 using the contact information. The mobile phone 130 then shares the live video received from the camera 115 with the first responder device 150 over the established connection. Accordingly, the first responder device 150 displays the live video displayed by the mobile phone 130 of the mom user. The established connection between the mobile phone 130 and the first responder device 150 may be a direct connection between the mobile phone 130 and the first responder device 150 that allows the first responder device 150 to receive shared video data from the mobile phone 130, but restricts the first responder device 150 from accessing other data of the mobile phone 130 or learning of identification information for the camera 115. As such, the established connection between the mobile phone 130 and the first responder device 150 allows the mom user to safely share the live video of the alarm condition with a first responder while preventing the first responder from accessing video captured by the camera 115 at other times.

In some implementations, the mobile phone 130 may store contact information for the first responder device 150 based on the address of the property 105 and the type of alarm condition. In these implementations, the first responder device 150 may be a central computer of an emergency services agency that is able to relay video to mobile devices used by first responders handling the alarm condition. For instance, when the alarm condition is an expected break in at the property 105, the mobile phone 130 may access contact information for a central computer at a police station that services the property 105 and share the video with the central computer at the police station with data indicating the address of the property 105. In this instance, the central computer at the police station may identify police officers responding to the alarm condition based on the address of the property 105, access contact information for mobile devices used by the identified police officers, and relay the shared video to the mobile devices used by the identified police officers. In another example, when the alarm condition is a fire at the property 105, the mobile phone 130 may access contact information for a central computer at a fire station that services the property 105 and share the video with the central computer at the fire station with data indicating the address of the property 105. In this example, the central computer at the fir station may identify firemen responding to the alarm condition based on the address of the property 105, access contact information for mobile devices used by the identified firemen, and relay the shared video to the mobile devices used by the identified firemen.

In some examples, the mobile phone 130 receives contact information for the first responder device 150 from the monitoring station device 160. In these examples, the first responder device 150 may be a mobile device used by a first responder assigned to handle the alarm condition at the property 105 and the monitoring station device 160 may receive contact information of the mobile device used by the first responder when dispatching emergency services. Accordingly, after receiving the contact information for the first responder device 150 from the monitoring station device 160, the mobile phone 130 is able to directly share the video of the property 105 with the mobile device used by the first responder.

When the mom user believes that the video would be helpful to a monitoring station operator that is determining whether to dispatch emergency services to the property 105 based on the alarm data, the mom user may activate the third button 134. In response to activation of the third button 134, the mobile phone 130 identifies contact information for the monitoring station device 160 (e.g., stored contact information for the monitoring station device 160 used by the monitoring station that services the property 105) and establishes a connection with the monitoring station device 160 using the contact information. The mobile phone 130 then shares the live video received from the camera 115 with the monitoring station device 160 over the established connection. Accordingly, the monitoring station device 160 displays the live video displayed by the mobile phone 130 of the mom user and, therefore, may be able to more quickly determine whether the alarm data signifies an actual alarm condition or a false alarm. The established connection between the mobile phone 130 and the monitoring station device 160 may be a direct connection between the mobile phone 130 and the monitoring station device 160 that allows the monitoring station device 160 to receive shared video data from the mobile phone 130, but restricts the monitoring station device 160 from accessing other data of the mobile phone 130 or learning of identification information for the camera 115. As such, the established connection between the mobile phone 130 and the monitoring station device 160 allows the mom user to safely share the live video of the alarm condition with a monitoring station operator while preventing the monitoring station operator from accessing video captured by the camera 115 at other times.

In some implementations, the monitoring station device 160 may be a central computer of a monitoring station that is able to relay video to devices used by operators employed by the monitoring station. In these implementations, the mobile phone 130 may store contact information for the central computer of the monitoring station and establish a connection with the central computer of the monitoring station. After establishing the connection, the mobile phone 130 shares the video over the established connection and also sends linking data to the central computer of the monitoring station that enables the central computer of the monitoring station to link the video with the alarm data received from the security system panel 120. The linking data may be any data that enables the central computer of the monitoring station to link the video with the alarm data. For instance, the linking data may be an address of the property 105, an account number for the security system at the property 105, etc. When the central computer of the monitoring station receives the linking data, the central computer of the monitoring station identifies which operator is handling the alarm data and routes the shared video to a device used by the identified operator so that the appropriate operator receives the video data. In this regard, the operator processing the alarm data may be able to more quickly determine whether the alarm condition is an actual alarm or a false alarm.

Figure 2:
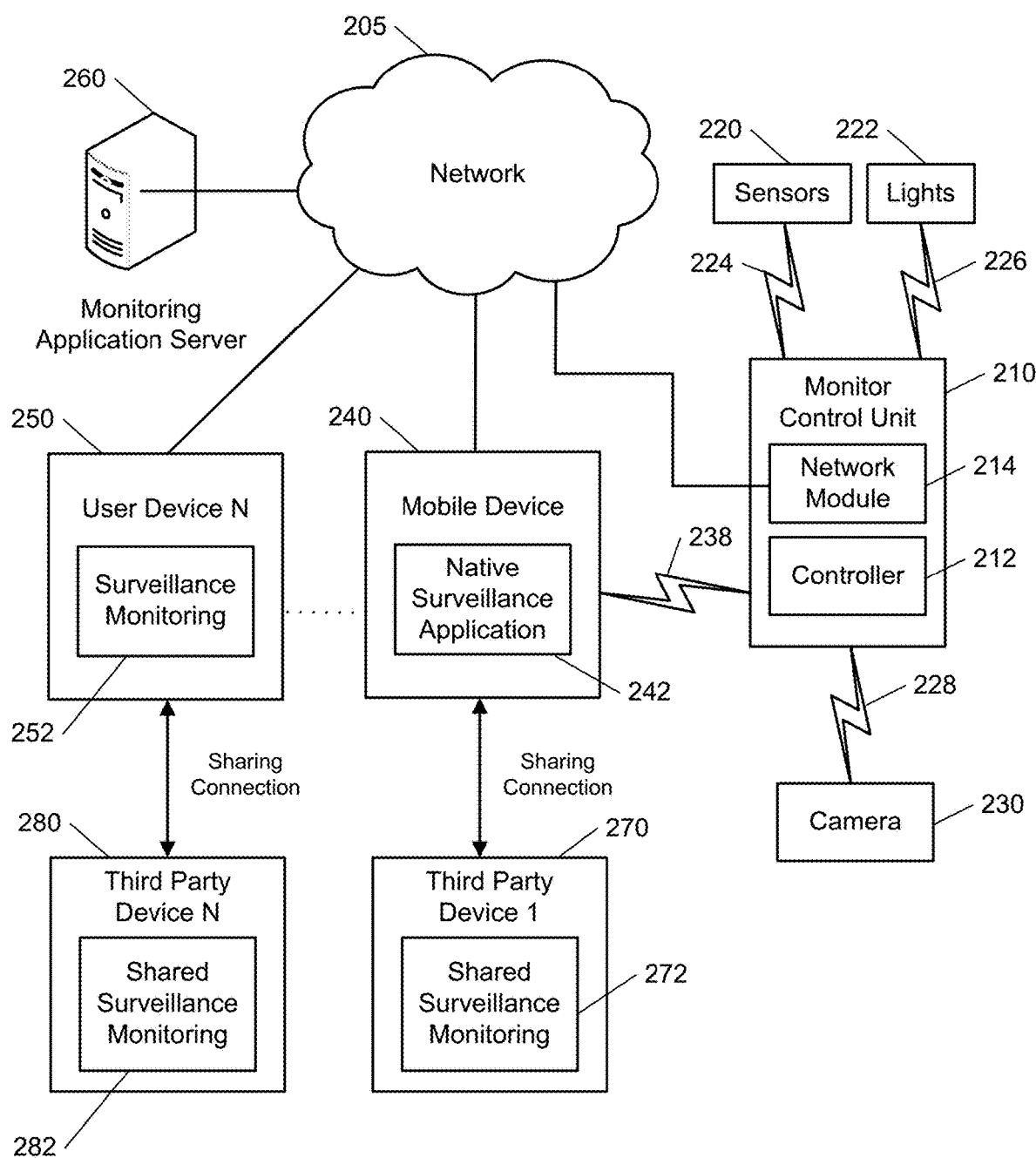
FIG. 2 illustrates an example system.

FIG. 2 illustrates an example of an electronic system 200 configured to provide video monitoring and alarm verification. The electronic system 200 includes a network 205, a monitoring system control unit 210, one or more user devices 240, 250, a monitoring application server 260, and one or more third party devices 270, 280. In some examples, the network 205 facilitates communications between the monitoring system control unit 210, the one or more user devices 240, 250, and the monitoring application server 260. The one or more third party devices 270, 280 also may be connected to the network 205 and exchange communications with other devices connected to the network 205.

The network 205 is configured to enable exchange of electronic communications between devices connected to the network 205. For example, the network 205 may be configured to enable exchange of electronic communications between the monitoring system control unit 210, the one or more user devices 240, 250, and the monitoring application server 260. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitoring system control unit 210. In some examples, the controller 212 may include a processor or other control circuitry configured to execute instructions of a program that controls operation of an alarm system. In these examples, the controller 212 may be configured to receive input from sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, LTE, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring system control unit 210 to communicate over a local area network and/or the Internet. The network module 214 also may be a voiceband modem configured to enable the alarm panel to communicate over the telephone lines of Plain Old Telephone Systems (POTS).

The monitoring system that includes the monitoring system control unit 210 includes one or more sensors or detectors. For example, the monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The monitoring system control unit 210 communicates with the module 222 and the camera 230 to perform visual surveillance or monitoring. The module 222 is connected to one or more lighting systems and is configured to control operation of the one or more lighting systems. The module 222 may control the one or more lighting systems based on commands received from the monitoring system control unit 210. For instance, the module 222 may cause a lighting system to illuminate an area to provide a better image of the area when captured by a camera 230.

The camera 230 may be a video/photographic camera or other type of optical sensing device configured to capture images. For instance, the camera 230 may be configured to capture images of an area within a building monitoring by the monitoring system control unit 210. The camera 230 may be configured to capture single, static images of the area and also video images of the area in which multiple images of the area are captured at a relatively high frequency (e.g., thirty images per second). The camera 230 may be controlled based on commands received from the monitoring system control unit 210.

The camera 230 may be triggered by several different types of techniques. For instance, a Passive Infra Red (PIR) motion sensor may be built into the camera 230 and used to trigger the camera 230 to capture one or more images when motion is detected. The camera 230 also may include a microwave motion sensor built into the camera and used to trigger the camera 230 to capture one or more images when motion is detected. The camera 230 may have a "normally open" or "normally closed" digital input that can trigger capture of one or more images when external sensors (e.g., the sensors 220, PIR, door/window, etc.) detect motion or other events. In some implementations, the camera 230 receives a software command to capture an image when external devices detect motion. The camera 230 may receive the software command from the controller 212 or directly from one of the sensors 220.

In some examples, the camera 230 triggers integrated or external illuminators (e.g., Infra Red, Z-wave controlled "white" lights, lights controlled by the module 222, etc.) to improve image quality when the scene is dark. An integrated or separate light sensor may be used to determine if illumination is desired and may result in increased image quality.

The sensors 220, the module 222, and the camera 230 communicate with the controller 212 over communication links 224, 226, and 228. The communication links 224, 226, and 228 may be a wired or wireless data pathway configured to transmit signals from the sensors 220, the module 222, and the camera 230 to the controller 212. The sensors 220, the module 222, and the camera 230 may continuously transmit sensed values to the controller 212, periodically transmit sensed values to the controller 212, or transmit sensed values to the controller 212 in response to a change in a sensed value.

The communication link 228 over which the camera 230 and the controller 212 communicate may include a local network. The camera 230 and the controller 212 may exchange images and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The monitoring application server 260 is an electronic device configured to provide monitoring services by exchanging electronic communications with the monitoring system control unit 210 and the one or more user devices 240, 250 over the network 205. For example, the monitoring application server 260 may be configured to monitor events generated by the monitoring system control unit 210. In this example, the monitoring application server 260 may exchange electronic communications with the network module 214 included in the monitoring system control unit 210 to receive information regarding alarm events detected by the monitoring system control unit 210. The monitoring application server 260 also may receive information regarding events from the one or more user devices 240, 250.

The monitoring application server 260 may store sensor and image/video data received from the monitoring system and perform analysis of sensor and image/video data received from the monitoring system. Based on the analysis, the monitoring application server 260 may communicate with and control aspects of the monitoring system control unit 210 or the one or more user devices 240, 250. The monitoring application server 260 also may make images/video captured by the camera 230 available to the one or more user devices 240, 250 over the network 205 (e.g., through a web portal). In this regard, the one or more user devices 240, 250 may display images/video captured by the camera 230 from a remote location. This enables a user to perceive images/video of the user's property from a remote location and verify whether or not an alarm event is occurring at the user's property.

The one or more user devices 240, 250 are devices that host and display user interfaces. For instance, the user device 240 is a mobile device that hosts one or more native applications (e.g., the native surveillance application 242). The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a native surveillance application 242. The native surveillance application 242 refers to a software/firmware program running on the corresponding mobile device that enables the user interface and features described throughout. The user device 240 may load or install the native surveillance application 242 based on data received over a network or data received from local media. The native surveillance application 242 runs on mobile devices platforms, such as iPhone, iPod touch, Blackberry, Google Android, Windows Mobile, etc. The native surveillance application 242 enables the user device 240 to receive and process image, video, and/or sensor data from the monitoring system.

The user device 250 may be a general-purpose computer (e.g., a desktop personal computer, a workstation, or a laptop computer) that is configured to communicate with the monitoring application server 260 and/or the monitoring system control unit 210 over the network 205. The user device 250 may be configured to display a surveillance monitoring user interface 252 that is generated by the user device 250 or generated by the monitoring application server 260. For example, the user device 250 may be configured to display a user interface (e.g., a web page) provided by the monitoring application server 260 that enables a user to perceive images/video captured by the camera 230 and/or reports related to the monitoring system. Although FIG. 2 illustrates two user devices for brevity, actual implementations may include more (and, perhaps, many more) or fewer user devices.

In some implementations, the one or more user devices 240, 250 communicate with and receive monitoring system data from the monitoring system control unit 210 using the communication link 238. For instance, the one or more user devices 240, 250 may communicate with the monitoring system control unit 210 using various local wireless protocols such as wifi, Bluetooth, zwave, zigbee, HomePlug (ethernet over powerline), or wired protocols such as Ethernet and USB, to connect the one or more user devices 240, 250 to local security and automation equipment. The one or more user devices 240, 250 may connect locally to the monitoring system and its sensors and other devices. The local connection may improve the speed of status and control communications because communicating through the network 205 with a remote server (e.g., the monitoring application server 260) may be significantly slower.

Although the one or more user devices 240, 250 are shown as communicating with the monitoring system control unit 210, the one or more user devices 240, 250 may communicate directly with the sensors and other devices controlled by the monitoring system control unit 210. In some implementations, the one or more user devices 240, 250 replace the monitoring system control unit 210 and perform the functions of the monitoring system control unit 210 for local monitoring and long range/offsite communication.

In other implementations, the one or more user devices 240, 250 receive monitoring system data captured by the monitoring system control unit 210 through the network 205. The one or more user devices 240, 250 may receive the data from the monitoring system control unit 210 through the network 205 or the monitoring application server 260 may relay data received from the monitoring system control unit 210 to the one or more user devices 240, 250 through the network 205. In this regard, the monitoring application server 260 may facilitate communication between the one or more user devices 240, 250 and the monitoring system.

In some implementations, the one or more user devices 240, 250 may be configured to switch whether the one or more user devices 240, 250 communicate with the monitoring system control unit 210 directly (e.g., through link 238) or through the monitoring application server 260 (e.g., through network 205) based on a location of the one or more user devices 240, 250. For instance, when the one or more user devices 240, 250 are located close to the monitoring system control unit 210 and in range to communicate directly with the monitoring system control unit 210, the one or more user devices 240, 250 use direct communication. When the one or more user devices 240, 250 are located far from the monitoring system control unit 210 and not in range to communicate directly with the monitoring system control unit 210, the one or more user devices 240, 250 use communication through the monitoring application server 260.

Although the one or more user devices 240, 250 are shown as being connected to the network 205, in some implementations, the one or more user devices 240, 250 are not connected to the network 205. In these implementations, the one or more user devices 240, 250 communicate directly with one or more of the monitoring system components and no network (e.g., Internet) connection or reliance on remote servers is needed.

In some implementations, the one or more user devices 240, 250 are used in conjunction with only local sensors and/or local devices in a house. In these implementations, the system 200 only includes the one or more user devices 240, 250 and the sensors 220, the module 222, and the camera 230. The one or more user devices 240, 250 receive data directly from the sensors 220, the module 222, and the camera 230 and sends data directly to the sensors 220, the module 222, and the camera 230. The one or more user devices 240, 250 provide the appropriate interfaces/processing to provide visual surveillance and reporting.

In other implementations, the system 200 further includes network 205 and the sensors 220, the module 222, and the camera 230 are configured to communicate sensor and image/video data to the one or more user devices 240, 250 over network 205 (e.g., the Internet, cellular network, etc.). In yet another implementation, the sensors 220, the module 222, and the camera 230 (or a component, such as a bridge/router) are intelligent enough to change the communication pathway from a direct local pathway when the one or more user devices 240, 250 are in close physical proximity to the sensors 220, the module 222, and the camera 230 to a pathway over network 205 when the one or more user devices 240, 250 are farther from the sensors 220, the module 222, and the camera 230. In some examples, the system leverages GPS information from the one or more user devices 240, 250 to determine whether the one or more user devices 240, 250 are close enough to the sensors 220, the module 222, and the camera 230 to use the direct local pathway or whether the one or more user devices 240, 250 are far enough from the sensors 220, the module 222, and the camera 230 that the pathway over network 205 is required. In other examples, the system leverages status communications (e.g., pinging) between the one or more user devices 240, 250 and the sensors 220, the module 222, and the camera 230 to determine whether communication using the direct local pathway is possible. If communication using the direct local pathway is possible, the one or more user devices 240, 250 communicate with the sensors 220, the module 222, and the camera 230 using the direct local pathway. If communication using the direct local pathway is not possible, the one or more user devices 240, 250 communicate with the sensors 220, the module 222, and the camera 230 using the pathway over network 205.

The one or more third party devices 270, 280 are devices that may establish connections with the one or more user devices 240, 250 and display user interfaces based on data (e.g., video or image data) received from the one or more user devices 240, 250. For instance, the one or more third party devices 270, 280 may include a mobile device that hosts one or more native applications. The one or more third party devices 270, 280 may include a cellular phone or a non-cellular locally networked device with a display. The one or more third party devices 270, 280 may include a mobile phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The one or more third party devices 270, 280 may perform functions unrelated to the monitoring system, such as placing personal telephone calls, playing music, playing video, displaying pictures, browsing the Internet, maintaining an electronic calendar, etc.

The one or more third party devices 270, 280 also may include a general-purpose computer (e.g., a desktop personal computer, a workstation, or a laptop computer) that is configured to communicate with the one or more user devices 240, 250 (e.g., over the network 205). The one or more third party devices 270, 280 may be configured to display a surveillance monitoring user interface 272, 282 that is generated by the one or more third party devices 270, 280, the one or more user devices 240, 250, or the monitoring application server 260. For example, the one or more third party devices 270, 280 may be configured to display a user interface that enables a user to perceive images/video captured by the camera 230 and/or reports related to the monitoring system. In this example, the one or more third party devices 270, 280 may receive the data included in the user interface from the one or more user devices 240, 250. Although FIG. 2 illustrates two third party devices for brevity, actual implementations may include more (and, perhaps, many more) or fewer third devices.

The one or more third party devices 270, 280 may be operated by a third party individual (such as a friend or relative) or a third party company (e.g., an alarm verification device of a central alarm monitoring station that dispatches emergency services based on alarm events detected by the monitoring system). The one or more third party devices 270, 280 establish a sharing connection with the one or more user devices 240, 250 to receive video, image, and/or other sensor data from the one or more user devices 240, 250. The sharing connection may be established over the network 205 or may be direct between the one or more user devices 240, 250 and the one or more third party devices 270, 280. The sharing connection enables the one or more user devices 240, 250 to control the data that the one or more third party devices 270, 280 receive. For instance, the one or more third party devices 270, 280 only receive data provided by the one or more user devices 240, 250 and do not have direct access to the monitoring system or the camera 230. In addition, the one or more third party devices 270, 280 may provide commands to control aspects of the monitoring system or the camera 230. Because the commands are received at the one or more user devices 240, 250, the one or more user devices 240, 250 control whether or not the commands are allowed and sent to the monitoring system. As such, the one or more user devices 240, 250 control what data the one or more third party devices 270, 280 receive and what actions the one or more third party devices 270, 280 can take with respect to the monitoring system. This may allow users to retain privacy in the monitoring system and be more likely to share limited access to the monitoring system information to enable alarm verification, which may be desired by central alarm monitoring stations that dispatch emergency services based on alarm events detected by the monitoring system.

In some implementations, the one or more user devices 240, 250 initiate the sharing connection based on a user input command entered by a user after reviewing video or image data from the camera 230. In these implementations, the one or more user devices 240, 250 may provide the one or more third party devices 270, 280 with information needed to establish the sharing connection in response to the user input command. For instance, the information may include a link that opens a portal that displays a shared image of a portal screen (e.g., a customer web/mobile portal screen) that allows the user operating the user device to control what data/video/image is shared with the recipient operating the third party device. The information also may include credentials, such as a password, a machine token, etc. that the third party device can use to be authenticated to the user device. The credentials may be temporary or one-time access credentials to prevent the third party device from using the credentials to gain access to the monitoring system at a later date.

In some examples, the one or more user devices 240, 250 may provide the one or more third party devices 270, 280 with permission or credentials to access the monitoring system directly or the monitoring application server 260 for a limited time. In these examples, the user device may provide the third party device with a link that the third party device can use to log into an event portal on the monitoring application server 260 that provides access to sensor status, live video, and saved clips relevant to the event. The material included in the event portal may be controlled by the user (e.g., using the user device) and access may be granted for a limited period of time.

Figure 3:
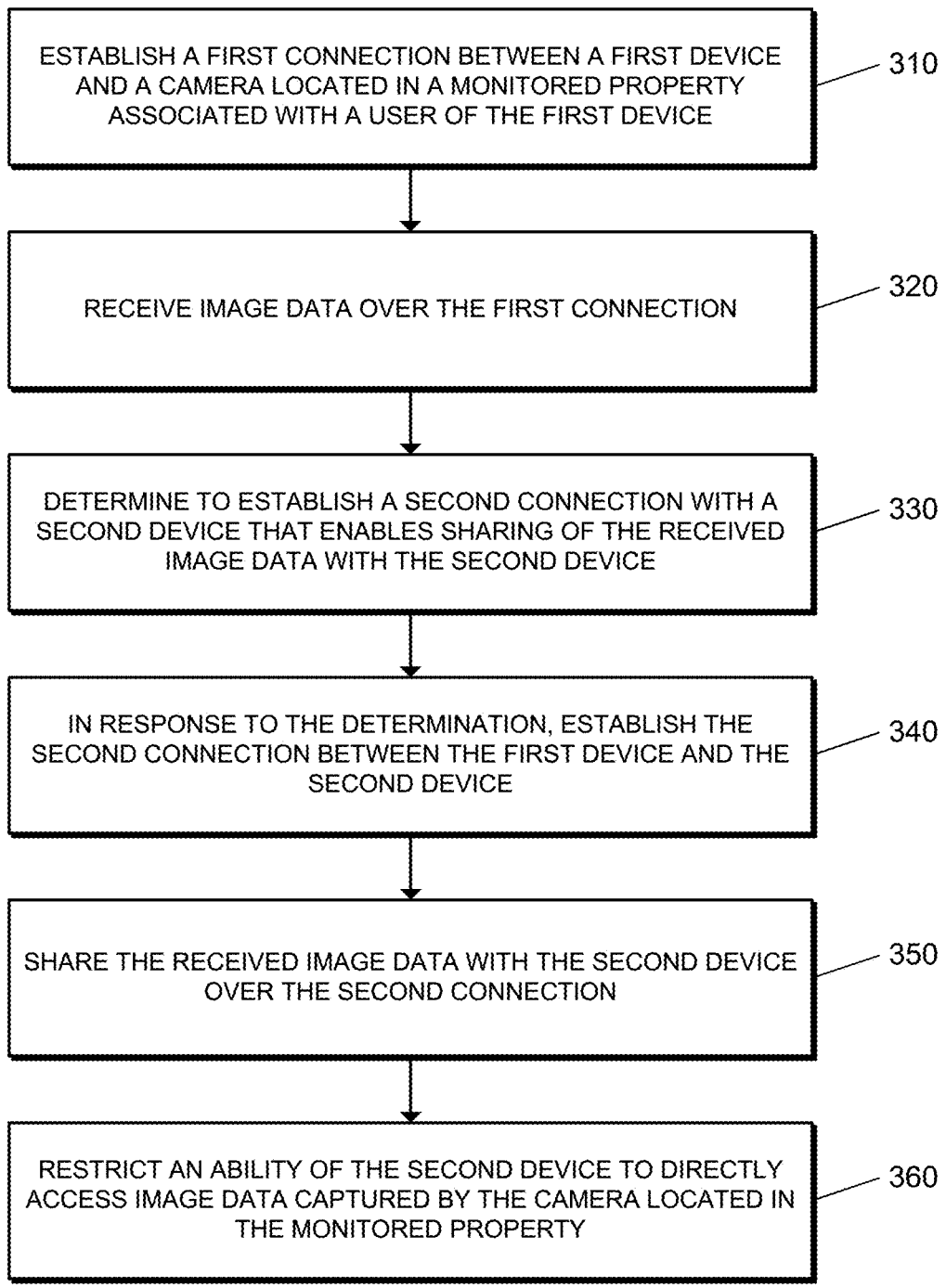
FIGS. 3, 5, and 7 are flow charts illustrating example processes.
Figure 5:
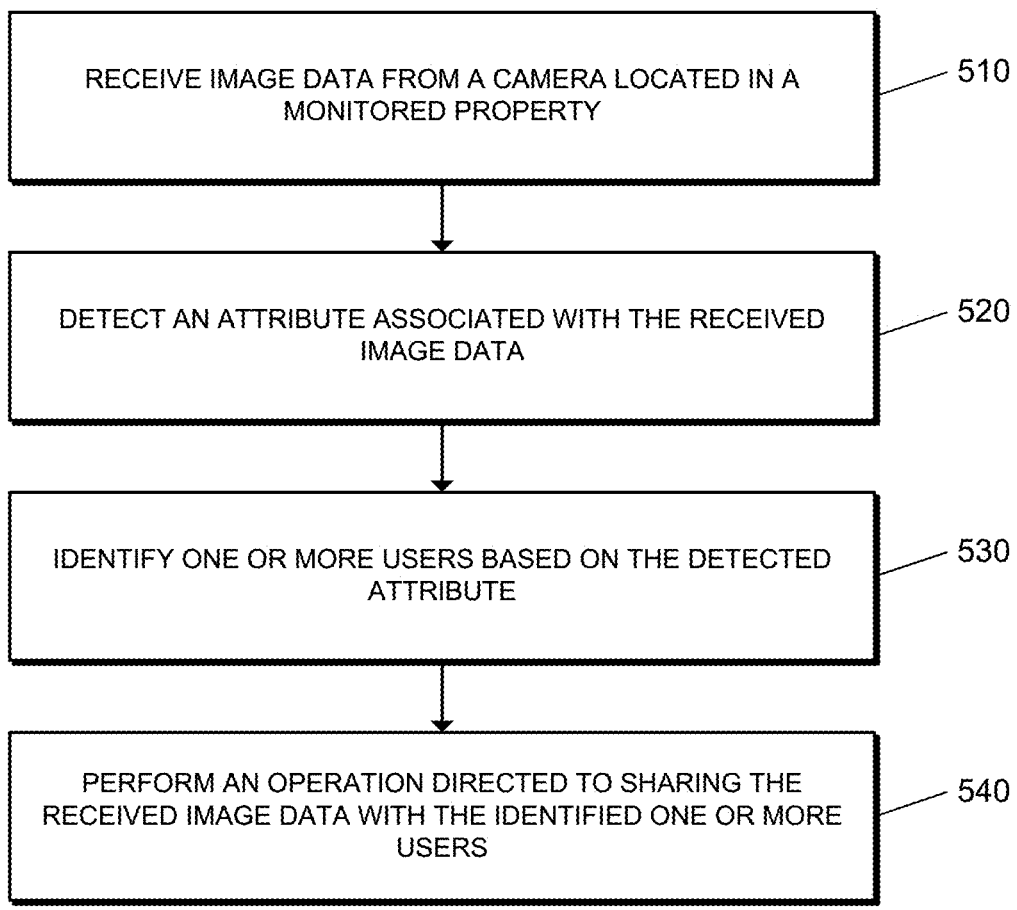
Figure 7:
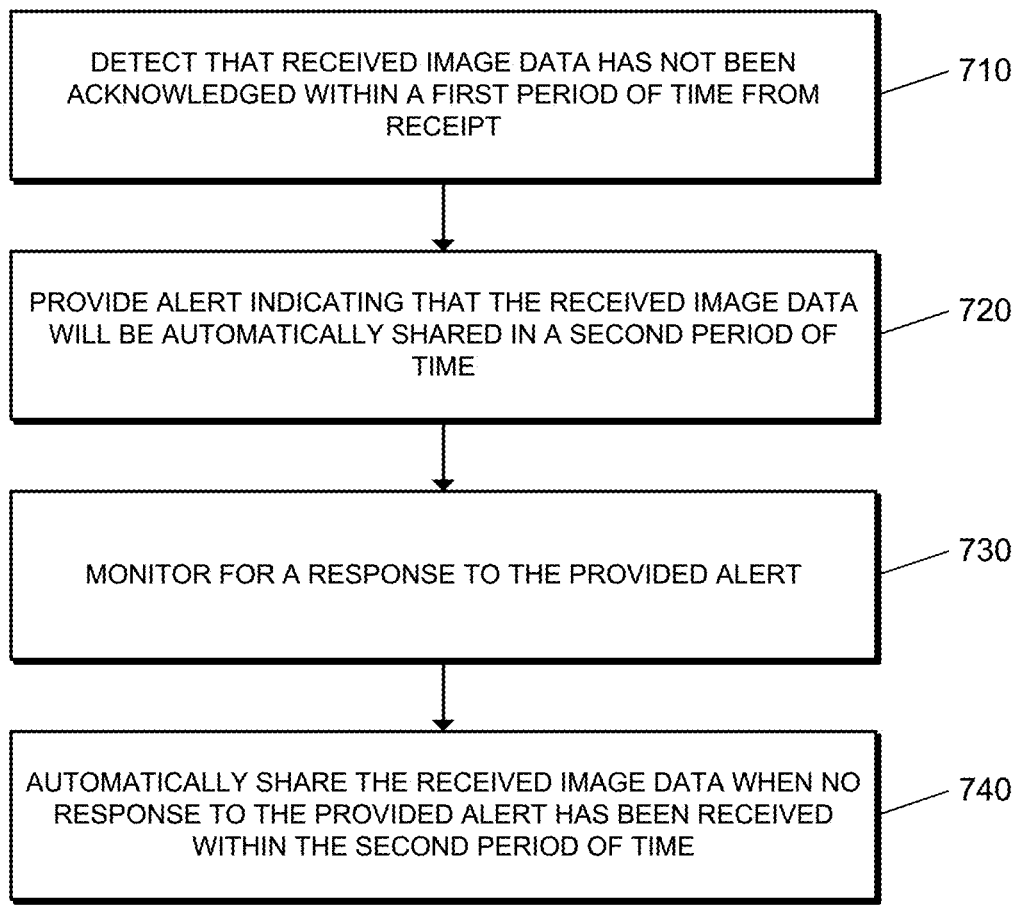

FIGS. 3, 5, and 7 illustrate example processes. The operations of the example processes are described generally as being performed by the system 200. The operations of the example processes may be performed by one of the components of the system 200 (e.g., one of the one or more user devices 240, 250) or may be performed by any combination of the components of the system 200. In some implementations, operations of the example processes may be performed by one or more processors included in one or more electronic devices.

FIG. 3 illustrates an example process 300 for sharing image data. The system 200 establishes a first connection between a first device and a camera located in a monitored property associated with a user of the first device (310). For example, the system 200 establishes a direct connection between the first device and the camera located in the monitored property associated with the user of the first device. In this example, the direct connection may be a connection where no intermediary device is present between the first device and the camera or may be a connection where only devices that simply route electronic communications between the first device and the camera are situated between the first device and the camera.

In some implementations, the system 200 establishes an indirect connection between the first device and the camera located in the monitored property associated with the user of the first device. In these implementations, the direct connection may be a connection where an intermediary device is present between the first device and the camera and coordinates communication between the first device and the camera. For instance, a security system panel or a monitoring server may be situated between the first device and the camera and may coordinate communications between the first device and the camera.

The system 200 receives image data over the first connection (320). For example, the first device receives image data over the first connection established between the first device and the camera. In this example, the image data may be a single still image captured by a camera or may be video captured by the camera. The camera may send live video of the monitored property associated with the user of the first device over the established connection and the first device may receive live video sent over the established connection.

The system 200 determines to establish a second connection with a second device that enables sharing of the received image data with the second device (330). For instance, the system 200 may receive user input indicating a desire of the user of the first device to share the received image data with the second device and determine to establish the second connection with the second device based on the received user input indicating the desire of the user of the first device to share the received image data with the second device. The user input may be selection of a share command button displayed by the first device in a list of possible sharing recipients.

In some examples, the system 200 may automatically, without user input, determine to share the received image data with the second device and determine to establish the second connection with the second device based on automatically, without user input, determining to share the received image data with the second device. In these examples, the system 200 may analyze the circumstances involved in the receipt of image data with respect to a set of rules and determine whether the received image data should be automatically shared based on the analysis. For instance, the rules may indicate that the received image data should be automatically shared with all users associated with the monitored property when the security system has detected an alarm at the monitored property or may indicate that the received image data should be automatically shared with a second user associated with the monitored property when the security system has detected an event associated with a room used by the second user.

In some implementations, the system 200 may determine to establish a second connection with a monitoring station device that is located at a monitoring station that monitors security system data from a security system located at the monitored property associated with the user of the first device. In these implementations, the system 200 establishes the second connection between the first device and the monitoring station device, shares, by the first device over the second connection, the received image data with the monitoring station device, and provides, by the first device over the second connection, identification information that enables the monitoring station device to link the shared image data with security system data received from the security system located at the monitored property over a communication pathway that is different than the first connection and the second connection. For example, the security system may send alarm data over a cellular communication pathway to the monitoring station and the first device may establish a connection with the monitoring station over an IP-based network. In this example, the first device shares the video from the camera with the monitoring station over the IP-based network and also provides an account number of the user to the monitoring station. The monitoring station then matches the account number of the user with the alarm data received over the cellular communication pathway and links the received video with the received alarm data, which may assist an operator with assessing the alarm data without allowing the operator to view video of the property at other times.

In response to the determination, the system 200 establishes the second connection between the first device and the second device (340). For instance, the system 200 establishes a direct or an indirect connection between the first device and the second device.

The system 200 shares the received image data with the second device over the second connection (350). For example, the first device sends still images or video to the second device over the second connection. In this example, still images or video of the monitored property may be displayed on the second device concurrently with display of the still images or video of the monitored property on the first device.

The system 200 restricts an ability of the second device to directly access image data captured by the camera located in the monitored property (360). For example, by only sharing the image data from the first device to the second device, the system 200 prevents the second device from establishing a connection with the camera located in the monitored property. Specifically, the second device is only aware of the first device and the image data received from the first device and the second connection is established in a manner that prevents the second device from perceiving and accessing the first connection with the camera. In addition, the second connection is established in a manner that prevents the second device from perceiving identification information for the camera that the second device could use to attempt to access the camera.

In some examples, the camera may be configured to only initiate connections with other outside devices. In these examples, the second device cannot directly connect to the camera because the camera refuses any connection requests made by the second device. In addition, passwords, machine tokens, or other authentication information may be needed to establish a connection with the camera. Because the second device does not have proper authentication information and cannot learn proper authentication information through the second connection with the first device, the second device is restricted from accessing the camera. By restricting the second device from accessing the camera, the system 200 may maintain privacy of a user of the monitored property while allowing the user to select certain times and certain people with which to temporary share video of the monitored property.

Figure 4:
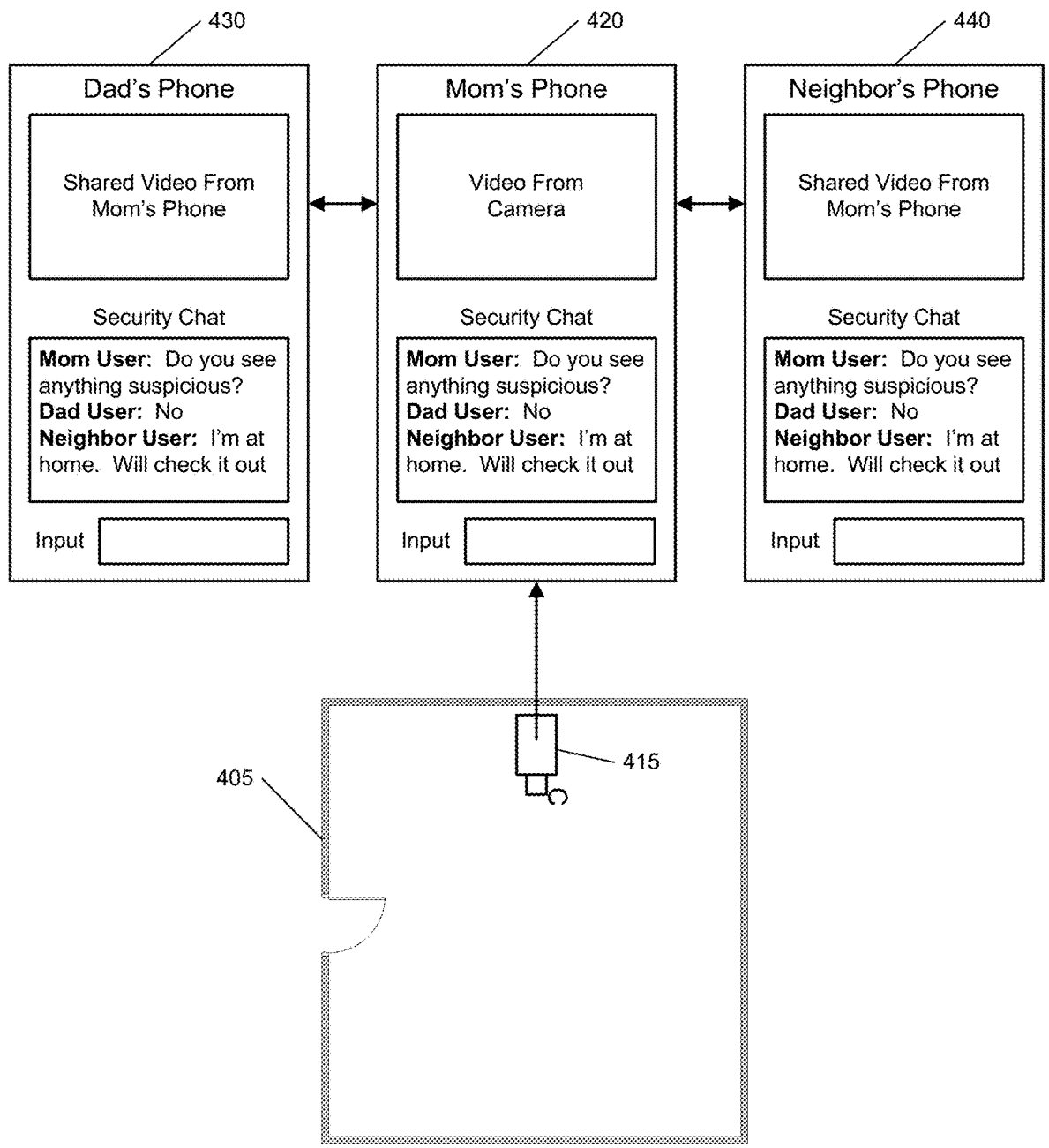
FIG. 4 illustrates an example of sharing image data.

FIG. 4 illustrates an example of sharing image data. As shown, a property 405 includes a camera 415 that captures images of the property 405. In response to an event detected at the property 405 or a user request to view video, the camera 415 establishes a direct connection with a mobile phone 420 of a mom user associated with the property 405. The mom user views video captured by the camera 415 on the mobile phone 420 and determines to share video received over the direct connection with the camera 415 with a mobile phone 430 of a dad user and a mobile phone 440 of a neighbor user. As shown, the mobile phone 420 of the mom user shares video data captured by the camera 415 with the mobile phone 430 of the dad user and the mobile phone 440 of the neighbor user. Accordingly, the dad user and the neighbor user can view the same video being perceived by the mom user on their respective mobile phones without being able to directly access the camera 415. In this regard, the mom user is able to maintain privacy in video of the property 405, but also share video of the property 405 when the mom user wishes to have assistance in assessing a potential alarm event at the property 405.

In addition, in some examples, when the mobile phone 420 of the mom user establishes connections with the mobile phone 430 of the dad user and the mobile phone 440 of the neighbor user to share the video received from the camera 415, the mobile phone 420 of the mom user also automatically, without additional user input, establishes a multi-user chat session between the mobile phone 420 of the mom user, the mobile phone 430 of the dad user, and the mobile phone 440 of the neighbor user. The multi-user chat session enables the mom user, the dad user, and the neighbor user to exchange text messages with one another that are seen by all users sharing the live video. The multi-user chat session may allow the mom user, the dad user, and the neighbor user to discuss the video that they are all simultaneously perceiving and come to a decision on how to handle the potential alarm situation. The multi-user chat session may exchange text-based messages using any appropriate protocol, such as an instant messaging protocol or a short message service (SMS) protocol.

FIG. 5 illustrates an example process 500 for sharing image data with users identified based on an attribute associated with the image data. The system 200 receives image data from a camera located in a monitored property (510). For example, the system 200 receives image data over a connection established between a device and the camera. In this example, the image data may be a single still image captured by the camera or may be video captured by the camera. The camera may send live video of a monitored property.

The system 200 detects an attribute associated with the received image data (520). For instance, the system 200 may detect one or more attributes of the camera that captured the image data, one or more attributes associated with the circumstances in which the camera began capturing and sending image data, and/or one or more attributes of the image data itself. The system 200 may detect any combination of one or more attributes associated with the received image data.

In detecting one or more attributes of the camera that captured the image data, the system 200 may determine camera identification data for the camera at the monitored property that captured the received image data. For instance, the system 200 may detect an identifier of the camera from which the image data is being received.

In detecting one or more attributes associated with the circumstances in which the camera began capturing and sending image data, the system 200 may detect sensor data, sensed by a security system at the monitored property, that triggered the camera at the monitored property to capture the received image data. For example, the system 200 may detect a motion sensor event, a door sensor event, and/or a window sensor event that was detected by the security system and triggered the camera to capture images. In this example, the attribute may indicate which sensor detected the event and provide information of detected activity at the monitored property occurring while the camera is capturing the received image data.

In detecting one or more attributes of the image data itself, the system 200 may use facial recognition processes to identify and recognize people included in the captured image data. For instance, the system 200 may detect whether any people are present in the image data and, if a person is included in the image data, detect an identity of the person if possible.

The system 200 identifies one or more users with which to consider sharing the image data based on the detected attribute (530). For instance, the system 200 may, based on the detected attribute, determine a subset of multiple users that are potential candidates for sharing the image data and that are likely to be interested in the image data. The system 200 may analyze any combination of one or more attributes associated with the received image data in determining the subset of multiple users.

When the system 200 detects one or more attributes of the camera that captured the image data, the system 200 may identify one or more users based on the one or more attributes of the camera that captured the image data. For instance, the system 200 may identify one or more users based on camera identification data for the camera at the monitored property that captured the received image data. In this instance, the system 200 may determine an area of the monitored property associated with the identified camera and identify one or more users associated with the area.

When the system 200 detects one or more attributes associated with the circumstances in which the camera began capturing and sending image data, the system 200 may identify one or more users based on the one or more attributes associated with the circumstances in which the camera began capturing and sending image data. For example, the system 200 may identify one or more users based on the sensor data that triggered the camera at the monitored property to capture the received image data. In this example, the system 200 may determine an area of the monitored property where activity has been detected and identify one or more users associated with the area.

When the system 200 detects one or more attributes of the image data itself, the system 200 may identify one or more users based on the one or more attributes of the image data itself. For instance, the system 200 may identify at least one different user when a person is detected within the image data as compared to when a person is not detected within the image data. In addition, when the system 200 detects an identity of a person, the system 200 may use the detected identity to select a user that would be interested in seeing image data including the person. When the system 200 detects an unidentified person, the system 200 may identify a monitoring station operator or a first responder as a user with which to share the image data.

In some implementations, the system 200 may access data defining a network of multiple users that are connected to the user of the first device and select, from the network of multiple users that are connected to the user of the first device, a subset of users based on the detected attribute. In these implementations, the network of multiple users may be all of the users that live at the monitored property. The network of multiple users also may be members of a social network of the user of the first device or other users registered as potential candidates for sharing image data by the user of the first device.

The system 200 performs an operation directed to sharing the received image data with the identified one or more users (540). For example, the system 200 may display, in a list, identification data for each of the identified one or more users to enable the user of the first device to select one or more users to share the received image data. In this example, the system 200 enables the user of the first device to quickly initiate sharing of the image data with a relatively small subset of users by presenting controls that enable the user to share the image data with any combination of the identified one or more users.

In some implementations, the system 200 automatically, without user input, shares the received image data with each of the identified one or more users. In these implementations, instead of waiting for the user of the first device to confirm that the image data should be shared, the system 200 automatically shares the image data such that the identified one or more users receive the image data as quickly as possible.

Figure 6A:
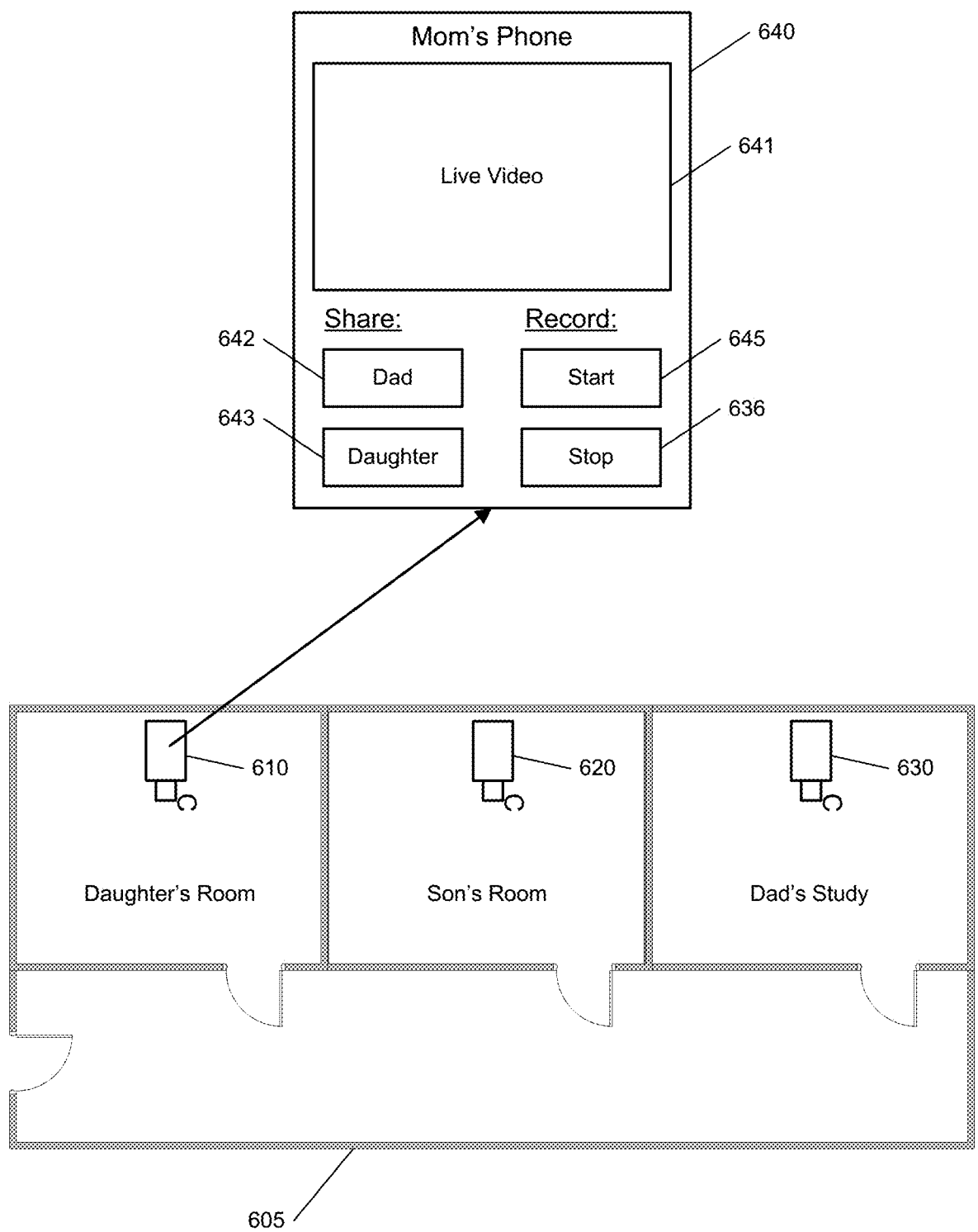
FIGS. 6A-6C illustrate examples of sharing image data with users identified based on an attribute associated with the image data.
Figure 6B:
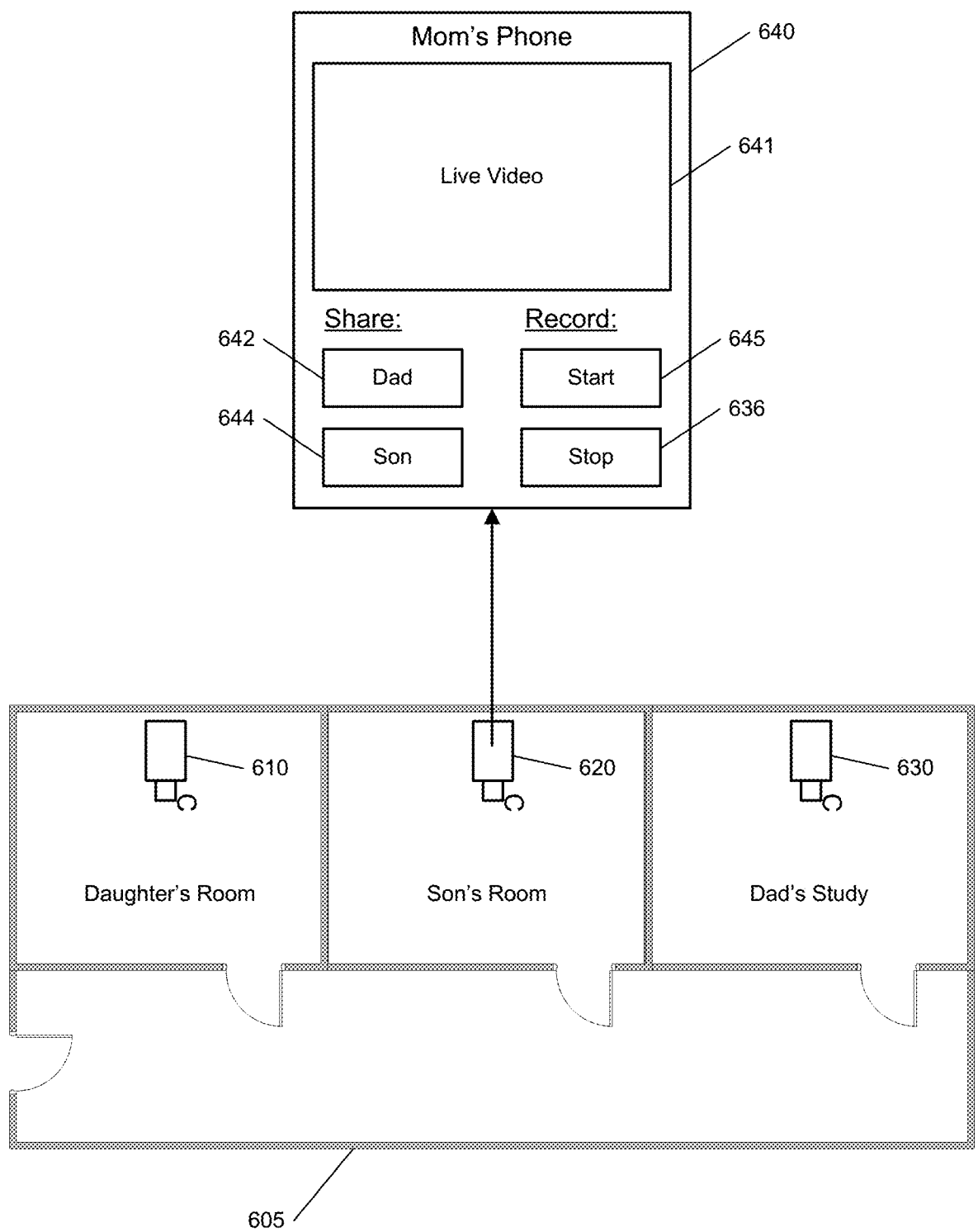
Figure 6C:
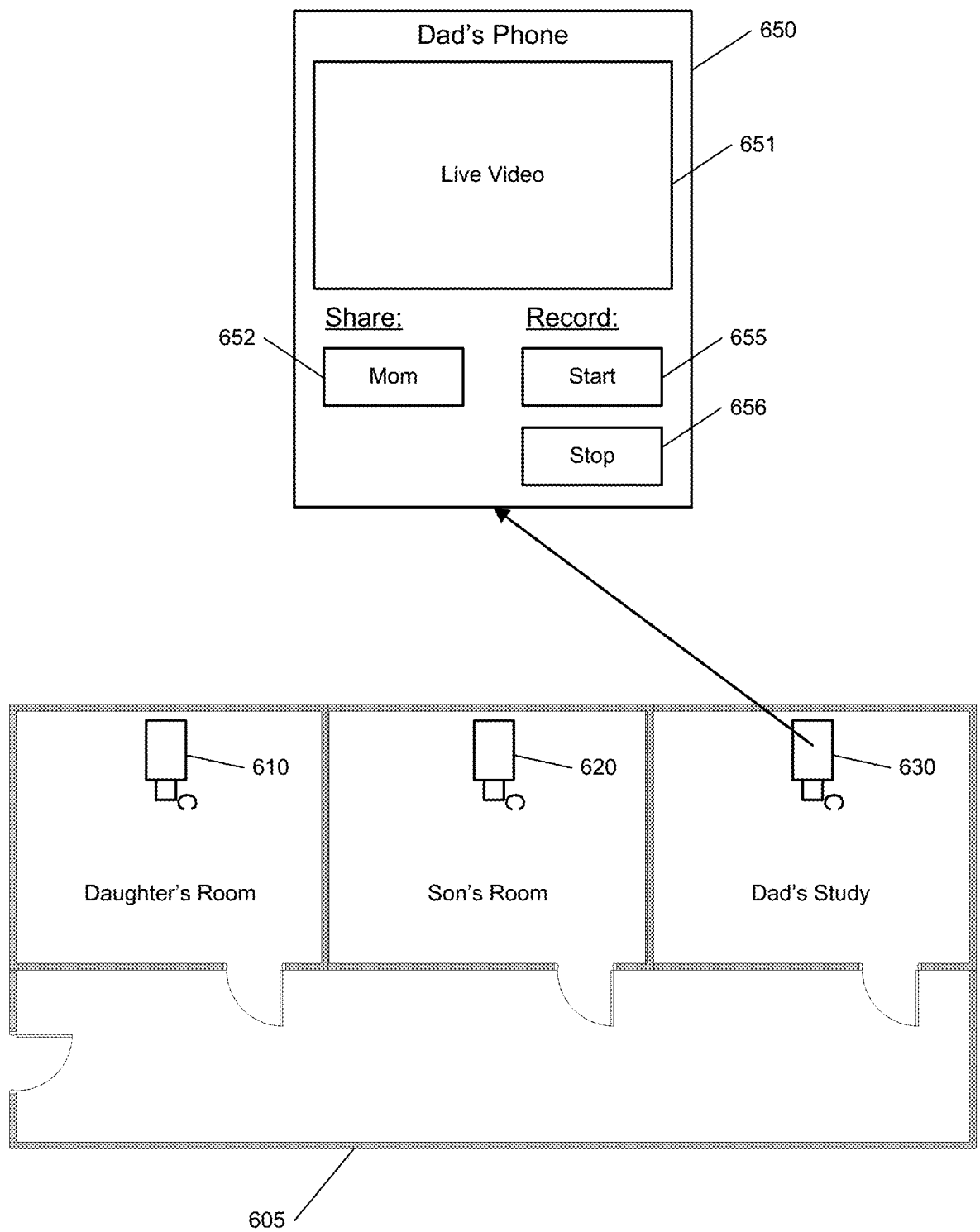

FIGS. 6A-6C illustrate examples of sharing image data with users identified based on an attribute associated with the image data. As shown, a property 605 includes a first camera 610 located in a daughter's room, a second camera 620 located in a son's room, and a third camera 630 located in a dad's study. In the first example shown in FIG. 6A, an event in the property 605 causes the first camera 610 to establish a connection with a mobile phone 640 of a mom user and begin sending video of the daughter's room to the mobile phone 640 of the mom user. The mobile phone 640 of the mom user includes a video display area 641 that displays the live video captured by the first camera 610 on the mobile phone 640. The mobile phone 640 also displays a list of virtual buttons 642 and 643 that the mom user can activate to initiate sharing of the live video to one or more other devices. The mobile phone 640 further displays a start button 645 and a stop button 646 that the mom user can activate to control recording of the live video on electronic storage of the mobile phone 640.

In the example shown in FIG. 6A, the mobile phone 640 dynamically selects the list of virtual buttons 642 and 643 based on an attribute associated with the video. For example, the attribute associated with the video may be identification information for the first camera 610 from which the video is being received. In this example, the mobile phone 640 may interpret the identification information for the first camera 610 and determine that the video is from the daughter's room based on a stored mapping of camera identification information to information describing camera location or associated user. In another example, the attribute associated with the video may be security system data captured by a security system at the property 605. In this example, the mobile phone 640 may receive security system data indicating that the event that triggered the first camera 610 to send video to the mobile phone 640 was associated with the daughter's room. For instance, the attribute may be a motion detection event sensed by a motion sensor positioned in the daughter's room or a combination of a first door sensor event detected by a door sensor at the front door and a second door sensor event detected by a door sensor at a door to the daughter's room. The mobile phone 640 may process the attributes of security system data and determine that the video is from the daughter's room or determine that the daughter would be interested in the video based on the other security system events detected at the property 605.

After processing one or more attributes associated with the video and determining that the video is from the daughter's room or that the daughter would be interested in the video, the mobile phone 640 dynamically selects the list of virtual buttons 642 and 643. As shown, the list of virtual buttons 642 and 643 includes a first button 642 that initiates sharing of the live video received from the first camera 610 with a dad user and a second button 643 that initiates sharing of the live video received from the first camera 610 with a daughter user. The mobile phone 640 suggests the dad user for sharing the video because the dad user is another primary contact for the property 605 and the mom user may be interested in sharing the video with the dad user to inform him of the situation and receive his opinion on the video. The mobile phone 640 also suggests the daughter user for sharing the video because the mobile phone 640 has detected that the video may be of interest to the daughter user based on one or more attributes associated with the video. The mom user may use the virtual buttons 642 and 643 to establish a connection and share the live video with any one or more the dad user and the daughter user.

In the second example shown in FIG. 6B, an event in the property 605 causes the second camera 620 to establish a connection with a mobile phone 640 of a mom user and begin sending video of the son's room to the mobile phone 640 of the mom user. In this example, the mobile phone 640 dynamically selects the list of virtual buttons 642 and 644 based on an attribute associated with the video. For instance, the attribute associated with the video may be identification information for the second camera 620 from which the video is being received. In this example, the mobile phone 640 may interpret the identification information for the second camera 620 and determine that the video is from the son's room based on a stored mapping of camera identification information to information describing camera location or associated user. In another example, the attribute associated with the video may be security system data captured by a security system at the property 605. In this example, the mobile phone 640 may receive security system data indicating that the event that triggered the second camera 620 to send video to the mobile phone 640 was associated with the son's room. For instance, the attribute may be a motion detection event sensed by a motion sensor positioned in the son's room or a combination of a first door sensor event detected by a door sensor at the front door and a second door sensor event detected by a door sensor at a door to the son's room. The mobile phone 640 may process the attributes of security system data and determine that the video is from the son's room or determine that the son would be interested in the video based on the other security system events detected at the property 605.

After processing one or more attributes associated with the video and determining that the video is from the son's room or that the son would be interested in the video, the mobile phone 640 dynamically selects the list of virtual buttons 642 and 644. As shown, the list of virtual buttons 642 and 644 includes a first button 642 that initiates sharing of the live video received from the second camera 620 with a dad user and a second button 644 that initiates sharing of the live video received from the second camera 620 with a son user. The mobile phone 640 suggests the dad user for sharing the video because the dad user is another primary contact for the property 605 and the mom user may be interested in sharing the video with the dad user to inform him of the situation and receive his opinion on the video. The mobile phone 640 also suggests the son user for sharing the video because the mobile phone 640 has detected that the video may be of interest to the son user based on one or more attributes associated with the video. The mom user may use the virtual buttons 642 and 644 to establish a connection and share the live video with any one or more the dad user and the son user.

In the third example shown in FIG. 6C, an event in the property 605 causes the third camera 630 to establish a connection with a mobile phone 650 of a dad user and begin sending video of the dad's study to the mobile phone 650 of the dad user. The mobile phone 650 of the dad user includes a video display area 651 that displays the live video captured by the third camera 630 on the mobile phone 650. The mobile phone 650 also displays a list of virtual buttons 652 that the dad user can activate to initiate sharing of the live video to one or more other devices. The mobile phone 650 further displays a start button 655 and a stop button 656 that the dad user can activate to control recording of the live video on electronic storage of the mobile phone 650.

In the example shown in FIG. 6C, the video is initially sent to the mobile phone 650 of the dad user as opposed to the mobile phone 640 of the mom user. The selection of the initial contact for the video data may be made based on an attribute associated with the video. For instance, in this example, the mobile phone 650 of the dad user may have been selected because the video is from the third camera 630 that captures video of the dad's study or because the security system at the property 605 detected events related to the dad's study (e.g., a motion sensor in the dad's study detecting motion or a door sensor for a door to the dad's study detecting a door opening event). In the other examples shown in FIGS. 6A and 6B, the mobile phone 640 of the mom user was selected because the mom user was registered as the default primary contact for video data or because the mom user was registered as the primary contact for video related to the daughter's room and the son's room.

Further, the mobile phone 650 dynamically selects the list of virtual buttons 652 based on an attribute associated with the video. For example, the attribute associated with the video may be identification information for the third camera 630 from which the video is being received. In this example, the mobile phone 650 may interpret the identification information for the third camera 630 and determine that the video is from the dad's study based on a stored mapping of camera identification information to information describing camera location or associated user. In another example, the attribute associated with the video may be security system data captured by a security system at the property 605. In this example, the mobile phone 650 may receive security system data indicating that the event that triggered the third camera 630 to send video to the mobile phone 650 was associated with the dad's study. For instance, the attribute may be a motion detection event sensed by a motion sensor positioned in the dad's study or a combination of a first door sensor event detected by a door sensor at the front door and a second door sensor event detected by a door sensor at a door to the dad's study. The mobile phone 650 may process the attributes of security system data and determine that the video is from the dad's study based on the other security system events detected at the property 605.

After processing one or more attributes associated with the video and determining that the video is from the dad's study, the mobile phone 650 dynamically selects the list of virtual buttons 652. As shown, the list includes only a first button 652 that initiates sharing of the live video received from the third camera 630 with the mom user. The mobile phone 650 suggests the mom user for sharing the video because the mom user is another primary contact for the property 605 and the dad user may be interested in sharing the video with the mom user to inform her of the situation and receive her opinion on the video. The mobile phone 650 does not suggest the daughter user or the son user because the daughter user or the son user are likely not interested in or are not permitted to view video of the dad's study. The dad user may use the buttons 652 to establish a connection and share the live video with the mom user.

FIG. 7 illustrates an example process 700 for automatically sharing image data. The system 200 detects that received image data has not been acknowledged within a first period of time from receipt (710). For instance, the system 200 determines that, although the image data has been received by a device, a user of the device has not acknowledged the image data in anyway. Accordingly, the image data may not have been displayed on the device and the device has received no confirmation that the image data has been perceived. These situations may occur when the device is separate from the user of the device (e.g., a misplaced mobile phone), unperceived by the user of the device (e.g., a mobile phone in a user's pocket or bag), or out of an area in which the image data can be shared (e.g., a mobile phone on an airplane).

The system 200 provides an alert indicating that the received image data will be automatically shared in a second period of time (720). For instance, the system 200 may provide an alert at the first device that receives the image data, may provide the alert through a security system located at the monitored property, and may provide the alert to another communication mechanism used by the user of the first device. The alert may attempt to alert the user to the image data and may indicate that the image data will be automatically shared in a period of time.

The system 200 monitors for a response to the provided alert (730). For example, the system 200 monitors whether the image data is acknowledged at the first device. In addition, the system 200 monitors for a response communication to the alert (e.g., a response electronic mail message indicating that the image data should not be shared).

The system 200 automatically shares the received image data when no response to the provided alert has been received within the second period of time (740). For instance, the system 200 determines that, after the second period of time expires, the image data has not been acknowledged and that a proper response communication has not been received to stop automatic sharing of the image data. In response to that determination, the system 200 automatically identifies contact information for a device with which to share the received image data and automatically establishes a connection with the device using the identified contact information. The system 200 then automatically shares the received image data over the established connection to provide the received image data to another user that may be able to assess the received image data while the user of the first device is unavailable.

Figure 8A:
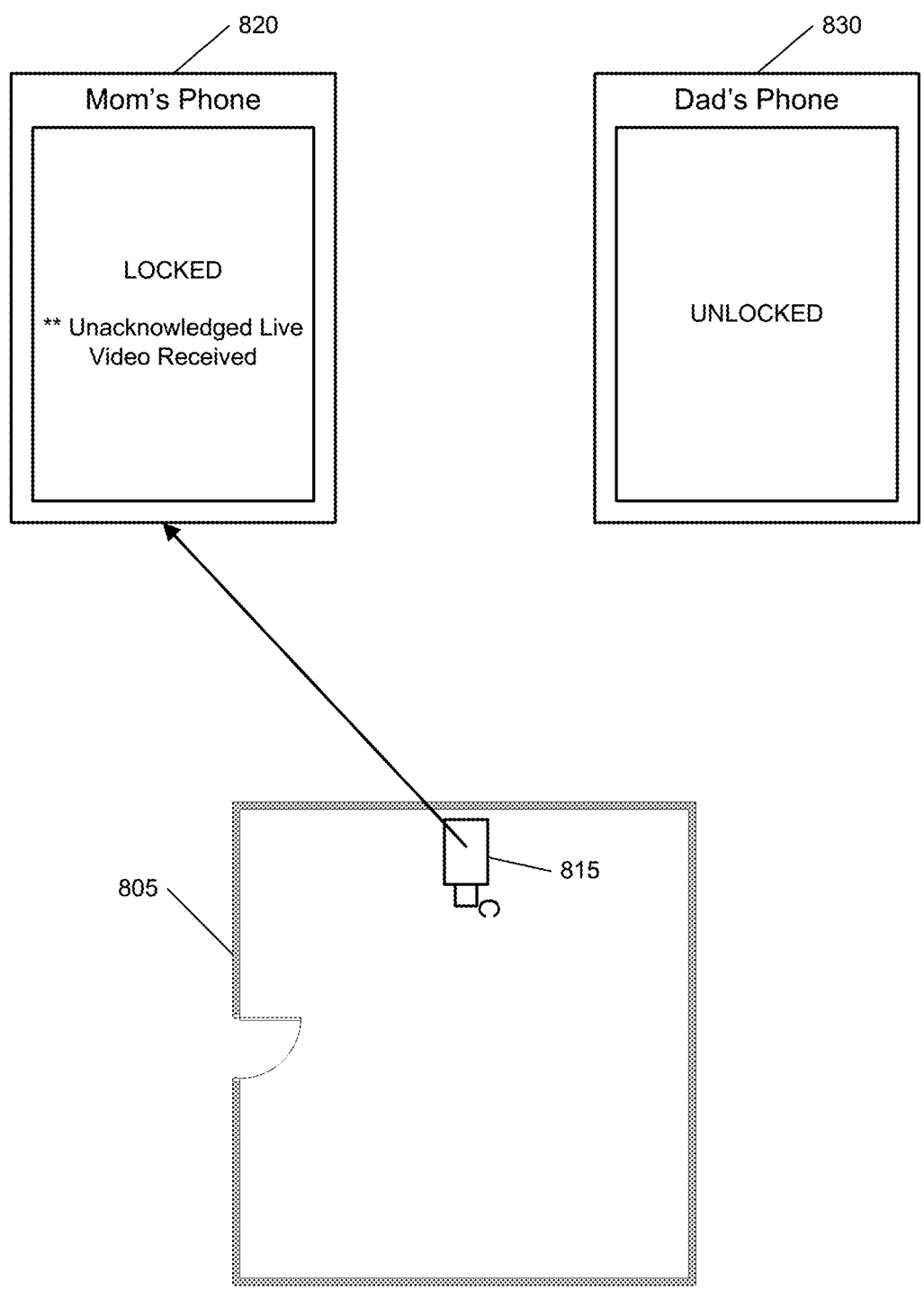
FIGS. 8A-8C illustrate an example of automatically sharing image data.
Figure 8B:
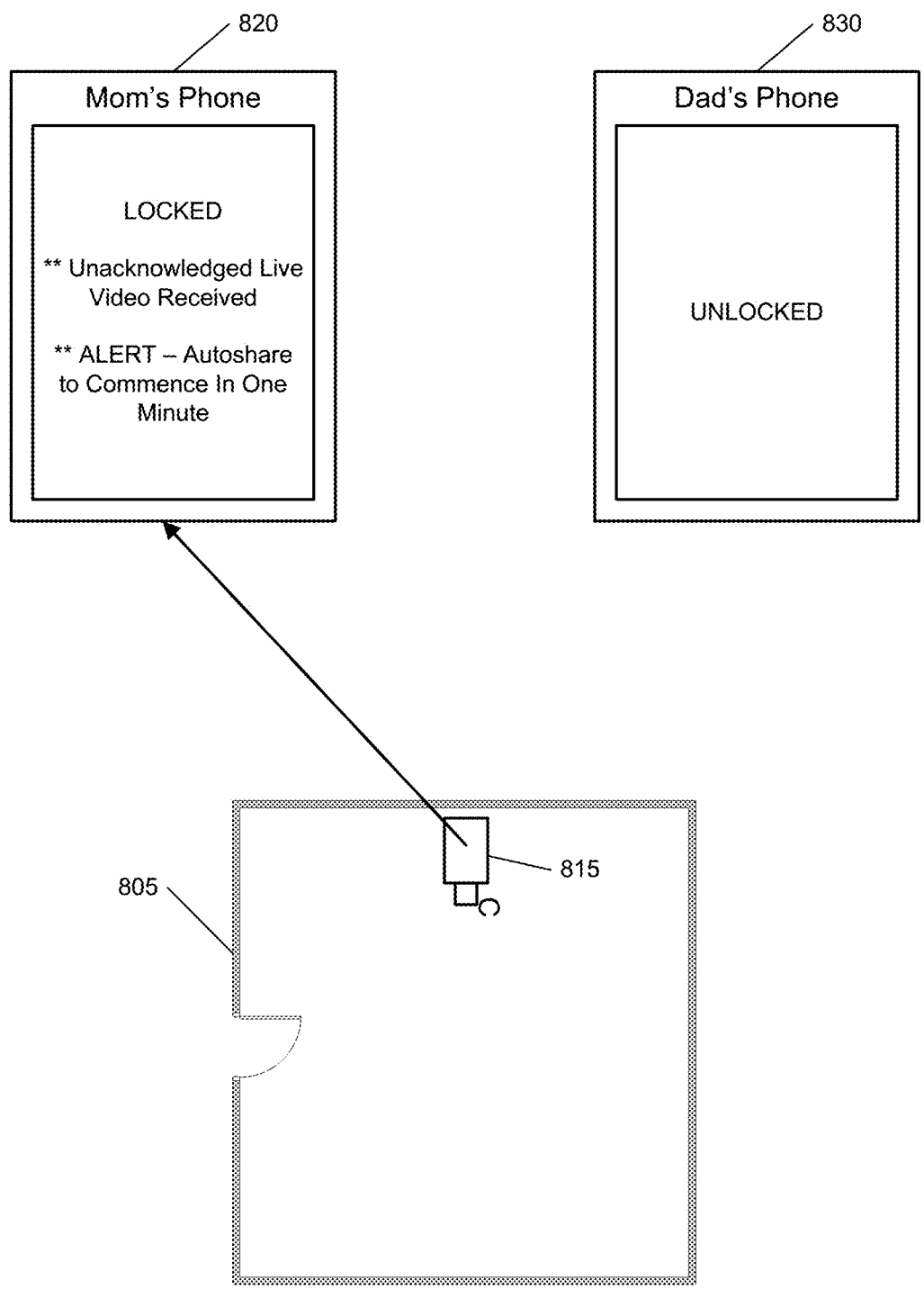
Figure 8C:
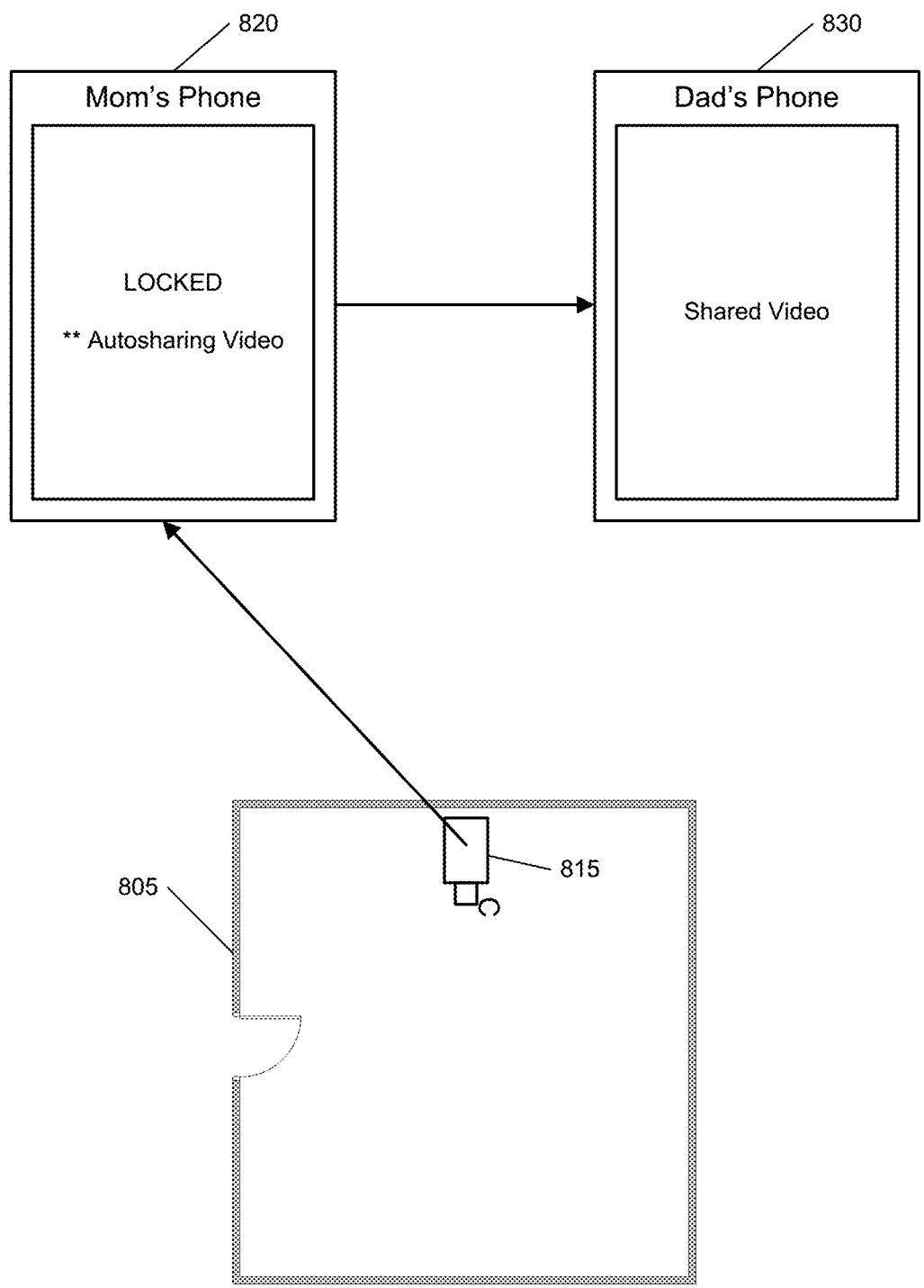

FIGS. 8A-8C illustrate an example of automatically sharing image data. As shown, a property 805 includes a camera 815 that captures images of the property 805. In response to an event detected at the property 805 (e.g., detection of an alarm event by a security system that monitors the property 805), the camera 815 establishes a direct connection with a mobile phone 820 of a mom user associated with the property 805 and begins sending video of the property 805 over the established connection. However, in this example, the mobile phone 820 of the mom user is in a locked state and the mom user does not view the video on her mobile phone 820. Accordingly, the mobile phone 820 of the mom user detects that live video has been received, but that the live video has not been acknowledged within a threshold period of time.

As shown in FIG. 8B, in response to detecting that live video has been received and has not been acknowledged within a threshold period of time, the mobile phone 820 of the mom user provides an alert indicating that the live video will be automatically shared with a mobile phone 830 of a dad user in one minute. For instance, the mobile phone 820 may provide the alert at the mobile device 820 by displaying the alert on a display screen of the mobile phone 820, activating a vibration device that causes the mobile phone 820 to vibrate, and/or outputting an audible alert using a speaker of the mobile phone 820. The mobile phone 820 also may send the alert as an electronic communication to other communication devices used by the mom user. For example, the mobile phone 820 may send the alert in an electronic mail message to an electronic mail address of the mom user, may send the alert in an instant message to an instant message account of the mom user, may send the alert in an SMS message to another mobile device used by the mom user, and/or may place an automated telephone call to another telephone number used by the mom user. In some examples, the mobile phone 820 further sends the alert to other users associated with the property 805 and that are authorized to perceive the live video in the event that the mom user is unavailable. In addition, the mobile phone 820 may send the alert to a security system associated with the property 805, so that the alert is output through the property 805 and a legitimate user in the property 805 can provide proper input to prevent the automatic sharing of the live video. Unless the live video is acknowledged on the mobile phone 820 or another control command is received by the mobile phone 820 in response to the alert (e.g., a return message indicating that the video should not be shared), the mobile phone 820 determines to automatically share the live video after the threshold period of time specified in the alert (i.e., one minute in this example) has passed.

As shown in FIG. 8C, the mobile phone 820 determines to automatically share the live video because the live video remains unacknowledged and another control command was not received within the threshold period of time specified in the alert. In this regard, the mobile phone 820 identifies the mobile phone 830 of the dad user as being the appropriate device with which to share the live video. For instance, the dad user may be registered as a secondary contact when the mom user is unavailable to handle alarm verification and the mobile phone 820 accesses contact information for the mobile phone 830 of the dad user. Using the contact information for the mobile phone 830, the mobile phone 820 of the mom user automatically, without user input, establishes a connection with the mobile phone 830 of the dad user and begins sharing the live video over the established connection. As shown, the mobile phone 830 of the dad user receives the shared video and begins displaying the shared video such that the dad user can view video of the property 805 and perform alarm verification or otherwise handle an alarm event at the property 805. In addition, because the mobile phone 830 of the dad user only receives video shared by the mobile phone 820 of the mom user, the dad user is unable to directly access the camera 815 and, as such, is unable to view video of the property 805 in situations where it is not shared by the mobile phone 820 of the mom user.

Although the example shown in FIGS. 8A-8C illustrates automatic sharing of video with a single user, the video may be automatically shared with multiple users. In addition, when the mobile phone 820 detects unacknowledged video, the mobile phone 820 may dynamically select one or more users for automatic sharing of video based on the circumstances. The dynamic selection may consider security system data at the property 805 and/or identification information for the camera 815 and the selection of one or more users with which to automatically share the video may leverage techniques described above with respect to FIGS. 5 and 6.

Using the techniques described throughout this disclosure a user may control access to video and/or image data captured by a camera in the user's monitoring system (e.g., home alarm system). In some implementations, the user may temporarily allow a third party, such as a monitoring station or the police, to view the video and/or image data for purposes of alarm verification. In these implementations, when the monitoring system detects an alarm event, the user may be provided with an alert on the user's device and be able to view the video and/or image data from a remote location using the user's device. When the user perceives occurrence of an alarm situation in the video and/or image data, the user can share the video and/or image data with a device operated by a monitoring station and/or the police to verify that an alarm situation actually exists. Because monitoring stations often undergo a series of checks and delay periods prior to dispatching emergency services in response to a detected alarm event, providing the monitoring station with access to the video and/or image data may allow faster and more accurate alarm verification and, thus, faster response from emergency services. In addition, because the user controls access to the video and/or image data and the access by the monitoring station is temporary, the user's privacy may remain protected.

In some implementations, video captured by a user's mobile device (e.g., the user's mobile phone) may be used for alarm verification purposes. For instance, a mobile device may be equipped with a camera and may be configured to capture live video using the camera. The mobile device also may include a native surveillance application that allows live video being captured by the mobile device to be shared with other users (e.g., a central monitoring station operator, a first responder, a family member, etc.) using techniques described throughout this disclosure. The shared live video may be used for alarm verification purposes in a similar manner as video or image data captured by a security system camera. For example, when the user is capturing live video with the mobile device of an alarm situation occurring in the user's home (e.g., a fire, an intruder attempting to enter the home, etc.), the live video may be shared with one or more other users to verify the alarm situation. In this example, the live video captured by the mobile device may be combined with video or image data captured by a security system camera to provide additional views of the user's home and enhance alarm verification. In addition, location data (e.g., a GPS location) of the mobile device may be shared along with the video to enable another user (e.g., a central monitoring station operator, a first responder, a family member, etc.) to verify the location at which the live video is being captured (e.g., verify that the user is actually capturing live video of his or her home).

In some situations, the user may use a mobile device to capture live video of an alarm situation occurring outside of a property monitored by the user's security system (e.g., outside of the user's home). In these situations, the user may activate the native surveillance application and begin sharing live video of the alarm situation with another user (e.g., a central monitoring station operator, a first responder, a family member, etc.). The native surveillance application also may share location data (e.g., a GPS location) of the mobile device to enable the other user to determine the location where the alarm situation is occurring. For example, the user may be involved a car accident and may activate the native surveillance application and begin sharing live video of the scene of the car accident with a central monitoring station operator. In this example, the central monitoring station operator may perceive the live video and quickly dispatch proper emergency services to the location of the car accident identified by location data shared by the mobile device. In another example, the user may be at a convenience store where a robbery is in progress. In this example, the user may discretely activate the native surveillance application and begin sharing live video of the robbery with a central monitoring station operator. The central monitoring station operator may perceive the live video and quickly dispatch proper emergency services to the location of the robbery identified by location data shared by the mobile device. Accordingly, the mobile device equipped with the native surveillance application may extend a user's security system outside of the user's home. In this regard, the mobile device equipped with the native surveillance application may provide a portable extension of the user's security system that enables central monitoring station assistance to be provided to the user even for alarm situations occurring outside of the user's home.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method comprising:
    based on an event detected at a property by a monitoring system or a request to view video of a camera included in the monitoring system, providing, to a first mobile device of a first user associated with the property, video captured by the camera included in the monitoring system for viewing by the first user;
    receiving, from the first mobile device and after providing the video to the first mobile device, first input selecting a portion of the video captured by the camera;
    receiving, from the first mobile device of the first user associated with the property, second input to share, with a second user, the selected portion of the video captured by the camera included in the monitoring system; and
    in response to receiving the second input to share, with the second user, the selected portion of the video captured by the camera included in the monitoring system, providing, to a second mobile device of the second user, the selected portion of the video captured by the camera included in the monitoring system.

2. The method of claim 1, wherein receiving, from the first mobile device of the first user associated with the property, the second input to share, with the second user, the selected portion of the video captured by the camera included in the monitoring system comprises receiving, from the first mobile device of the first user associated with the property, the second input to share the selected portion of the video captured by the camera included in the monitoring system with a second user that is not associated with the property.

3. The method of claim 2, wherein receiving, from the first mobile device of the first user associated with the property, the second input to share the selected portion of the video captured by the camera included in the monitoring system with the second user that is not associated with the property comprises receiving, from the first mobile device of the first user associated with the property, the second input to share the selected portion of the video captured by the camera included in the monitoring system with a neighbor user that is associated with a neighboring property that is different from the property.

4. The method of claim 1, further comprising in response to receiving the second input to share, establishing a chat session between the first mobile device of the first user and the second mobile device of the second user, the chat session being presented with the selected portion of the video captured by the camera included in the monitoring system and enabling the first user and the second user to discuss the selected portion of the video captured by the camera included in the monitoring system.

5. The method of claim 4, wherein establishing the chat session between the first mobile device of the first user and the second mobile device of the second user comprises automatically, without user additional user input, establishing the chat session between the first mobile device of the first user and the second mobile device of the second user based on the second input to share, with the second user, the selected portion of the video captured by the camera included in the monitoring system.

6. The method of claim 1, comprising:
detecting the event at the property,
wherein providing, to the first mobile device of the first user associated with the property, video captured by the camera included in the monitoring system for viewing by the first user comprises, in response to detecting the event at the property, providing, to the first mobile device of the first user associated with the property, video captured by the camera included in the monitoring system for viewing by the first user.

7. The method of claim 1, comprising:
receiving the request to view video of a camera included in the monitoring system,
wherein providing, to the first mobile device of the first user associated with the property, video captured by the camera included in the monitoring system for viewing by the first user comprises, in response to receiving the request to view video of the camera included in the monitoring system, providing, to the first mobile device of the first user associated with the property, the video captured by the camera included in the monitoring system for viewing by the first user.

8. The method of claim 1:
wherein receiving, from the first mobile device of the first user associated with the property, the second input to share, with the second user, the selected portion of the video captured by the camera included in the monitoring system comprises receiving, from the first mobile device of the first user associated with the property, the second input to share the selected portion of the video captured by the camera included in the monitoring system with a second user that is not associated with the property and a third user that is associated with the property; and
wherein providing, to the second mobile device of the second user, the selected portion of the video captured by the camera included in the monitoring system comprises providing, to the second mobile device of the second user and to a third mobile device of the third user that is associated with the property, the selected portion of the video captured by the camera included in the monitoring system.

9. The method of claim 8, wherein receiving, from the first mobile device of the first user associated with the property, the second input to share the selected portion of the video captured by the camera included in the monitoring system with the second user that is not associated with the property and the third user that is associated with the property comprises receiving, from the first mobile device of the first user associated with the property, the second input to share the selected portion of the video captured by the camera included in the monitoring system with a neighbor user that is associated with a neighboring property that is different from the property and an occupant user that is an occupant of the property.

10. The method of claim 8, further comprising establishing a chat session between the first mobile device of the first user, the second mobile device of the second user, and third mobile device of the third user, the chat session being presented with the selected portion of the video captured by the camera included in the monitoring system and enabling the first user, the second user, and the third user to discuss the selected portion of the video captured by the camera included in the monitoring system.

11. A system comprising:
a monitoring system associated with a property; and
a remote server configured to perform operations comprising:
based on an event detected at the property by the monitoring system or a request to view video of a camera included in the monitoring system, providing, to a first mobile device of a first user associated with the property, video captured by the camera included in the monitoring system for viewing by the first user;
receiving, from the first mobile device and after providing the video to the first mobile device, first input selection a portion of the video captured by the camera;
receiving, from the first mobile device of the first user associated with the property, second input to share, with a second user, the selected portion of the video captured by the camera included in the monitoring system; and
in response to receiving the second input to share, with the second user, the selected portion of the video captured by the camera included in the monitoring system, providing, to a second mobile device of the second user, the selected portion of the video captured by the camera included in the monitoring system.

12. The system of claim 11, wherein receiving, from the first mobile device of the first user associated with the property, the second input to share, with the second user, the selected portion of the video captured by the camera included in the monitoring system comprises receiving, from the first mobile device of the first user associated with the property, the second input to share the selected portion of the video captured by the camera included in the monitoring system with a second user that is not associated with the property.

13. The system of claim 12, wherein receiving, from the first mobile device of the first user associated with the property, the second input to share the selected portion of the video captured by the camera included in the monitoring system with the second user that is not associated with the property comprises receiving, from the first mobile device of the first user associated with the property, the second input to share the selected portion of the video captured by the camera included in the monitoring system with a neighbor user that is associated with a neighboring property that is different from the property.

14. The system of claim 11, wherein the operations further comprise in response to receiving the second input to share, establishing a chat session between the first mobile device of the first user and the second mobile device of the second user, the chat session being presented with the selected portion of the video captured by the camera included in the monitoring system and enabling the first user and the second user to discuss the selected portion of the video captured by the camera included in the monitoring system.

15. The system of claim 14, wherein establishing the chat session between the first mobile device of the first user and the second mobile device of the second user comprises automatically, without user additional user input, establishing the chat session between the first mobile device of the first user and the second mobile device of the second user based on the second input to share, with the second user, the selected portion of the video captured by the camera included in the monitoring system.

16. The system of claim 11, comprising:
detecting the event at the property,
wherein providing, to the first mobile device of the first user associated with the property, video captured by the camera included in the monitoring system for viewing by the first user comprises, in response to detecting the event at the property, providing, to the first mobile device of the first user associated with the property, video captured by the camera included in the monitoring system for viewing by the first user.

17. The system of claim 11, comprising:
receiving the request to view video of a camera included in the monitoring system,
wherein providing, to the first mobile device of the first user associated with the property, video captured by the camera included in the monitoring system for viewing by the first user comprises, in response to receiving the request to view video of the camera included in the monitoring system, providing, to the first mobile device of the first user associated with the property, the video captured by the camera included in the monitoring system for viewing by the first user.

18. The system of claim 11:
wherein receiving, from the first mobile device of the first user associated with the property, the second input to share, with the second user, the selected portion of the video captured by the camera included in the monitoring system comprises receiving, from the first mobile device of the first user associated with the property, the second input to share the selected portion of the video captured by the camera included in the monitoring system with a second user that is not associated with the property and a third user that is associated with the property; and
wherein providing, to the second mobile device of the second user, the selected portion of the video captured by the camera included in the monitoring system comprises providing, to the second mobile device of the second user and to a third mobile device of the third user that is associated with the property, the selected portion of the video captured by the camera included in the monitoring system.

19. The system of claim 18, wherein receiving, from the first mobile device of the first user associated with the property, the second input to share the selected portion of the video captured by the camera included in the monitoring system with the second user that is not associated with the property and the third user that is associated with the property comprises receiving, from the first mobile device of the first user associated with the property, the second input to share the selected portion of the video captured by the camera included in the monitoring system with a neighbor user that is associated with a neighboring property that is different from the property and an occupant user that is an occupant of the property.

20. The system of claim 18, wherein the operations further comprise establishing a chat session between the first mobile device of the first user, the second mobile device of the second user, and third mobile device of the third user, the chat session being presented with the selected portion of the video captured by the camera included in the monitoring system and enabling the first user, the second user, and the third user to discuss the selected portion of the video captured by the camera included in the monitoring system.

* * * * *